United States Patent
Hashimoto et al.

(10) Patent No.: US 9,325,271 B2
(45) Date of Patent: Apr. 26, 2016

(54) PARALLEL RUNNING CONTROL APPARATUS FOR INVERTER GENERATORS

(75) Inventors: Shoji Hashimoto, Wako (JP); Kazufumi Muronoi, Wako (JP); Maodao Fu, Wako (JP); Yasunori Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 881 days.

(21) Appl. No.: 13/472,558

(22) Filed: May 16, 2012

(65) Prior Publication Data
US 2012/0294049 A1 Nov. 22, 2012

(30) Foreign Application Priority Data

May 17, 2011 (JP) ................................. 2011-110568
May 17, 2011 (JP) ................................. 2011-110569
May 17, 2011 (JP) ................................. 2011-110570

(51) Int. Cl.
*H02J 1/00* (2006.01)
*H02J 3/00* (2006.01)
*H02P 25/22* (2006.01)
*H02P 9/02* (2006.01)

(52) U.S. Cl.
CPC . *H02P 25/22* (2013.01); *H02P 9/02* (2013.01)

(58) Field of Classification Search
CPC .......... H02P 25/22; H02P 9/02; H02M 7/483; H02M 7/48; H02M 7/49; H02M 1/12; H02M 2001/0006; H02M 3/158; H02M 5/458; H02M 7/217; H02M 7/219; H02M 7/42; H02M 7/487; H02M 7/5387

USPC .............................................. 307/84; 363/37
See application file for complete search history.

(56) References Cited

U.S. PATENT DOCUMENTS

| 5,373,196 | A * | 12/1994 | Faley ............................... 307/46 |
| 5,852,554 | A * | 12/1998 | Yamamoto ....................... 363/71 |
| 6,246,209 | B1 * | 6/2001 | Kim ............................... 318/811 |
| 6,483,730 | B2 * | 11/2002 | Johnson, Jr. ................... 363/123 |
| 6,700,802 | B2 * | 3/2004 | Ulinski et al. .................... 363/37 |

(Continued)

FOREIGN PATENT DOCUMENTS

| CN | 2032959 | 2/1989 |
| CN | 101375224 | 2/2009 |

(Continued)

OTHER PUBLICATIONS

Translation of Xian et al, CN 201656894 U, Nov. 24, 2011.*

(Continued)

*Primary Examiner* — Jared Fureman
*Assistant Examiner* — Esayas Yeshaw
(74) *Attorney, Agent, or Firm* — Rankin, Hill & Clark LLP

(57) ABSTRACT

In a parallel running control apparatus for an inverter generator A having a first, second and third inverters each connected to three windings wound around an alternator driven by an engine and converts alternating current outputted therefrom to direct/alternating current to output alternating current, and first, second and third controllers to control turning ON/OFF of the switching elements, and the inverter generator A is configured to run in parallel with at least one inverter generator B which is configured to be same as the inverter generator A to output a three-phase alternating current.

16 Claims, 14 Drawing Sheets

(56) References Cited

U.S. PATENT DOCUMENTS

| | | | |
|---|---|---|---|
| 7,535,120 B2* | 5/2009 | Erdman et al. | 307/47 |
| 7,733,674 B2* | 6/2010 | Imazu et al. | 363/41 |
| 2005/0162192 A1* | 7/2005 | Rhee | 326/113 |
| 2008/0073979 A1* | 3/2008 | Wiegman et al. | 307/84 |
| 2010/0007207 A1* | 1/2010 | Peuser | 307/10.1 |
| 2011/0190949 A1 | 8/2011 | Peuser et al. | |
| 2011/0221269 A1* | 9/2011 | Borger et al. | 307/26 |

FOREIGN PATENT DOCUMENTS

| | | |
|---|---|---|
| CN | 201656894 | 11/2010 |
| JP | 2996542 | 1/2000 |
| JP | 3363170 | 1/2003 |

OTHER PUBLICATIONS

Chinese Office Action dated Jun. 3, 2014, Application No. 201210154393.2; English translation included.

\* cited by examiner

REFERENCE SIGNAL

SYNCHRONOUS SIGNAL 1

SYNCHRONOUS SIGNAL 2

GENERATING SQUARE WAVE SHIFTED BY 120 AND 240 DEGREE

WHEN LOWERING FREQUENCY OF REFERENCE WAVE

REFERENCE SIGNAL

SYNCHRONOUS SIGNAL 1

SYNCHRONOUS SIGNAL 2

ALWAYS GENERATING SYNCHRONIZED SIGNAL CORRESPONDING TO INCREASING AND DECREASING FREQUENCY OF REFERENCE SIGNAL

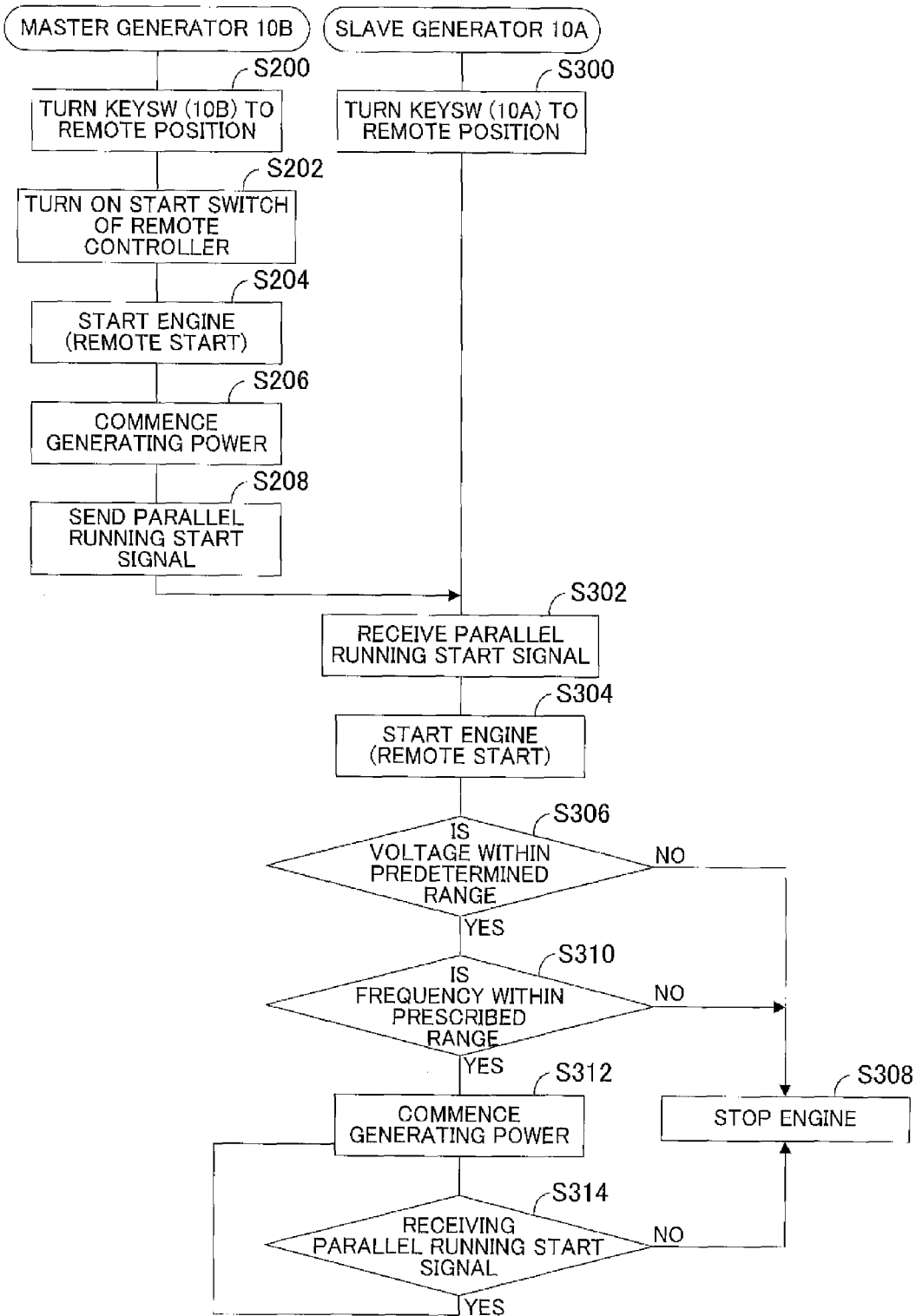

US 9,325,271 B2

PARALLEL RUNNING CONTROL APPARATUS FOR INVERTER GENERATORS

BACKGROUND OF THE INVENTION

1. Technical Field

Embodiments of the invention relate to a parallel running control apparatus for inverter generators, particularly to a control apparatus that can run inverter generators outputting a three-phase alternating current in parallel.

2. Background Art

Conventionally, there is a well-known technique for a parallel running control apparatus for inverter generators, as taught, for example, by Japanese Patent No. 2996542. In the reference, a phase and a voltage amplitude of a single-phase two-wire inverter generator are synchronized with the ones of other single-phase two-wire inverter generators, such that the generators are run in parallel.

SUMMARY

In the technique of the reference, it only discloses for running single-phase two-wire inverter generators in parallel by synchronizing a phase and a voltage amplitude. However, for three-phase alternating current inverter generators, since it is required to synchronize each phase and each voltage amplitude of a three-phase alternating current of one generator with the ones of other generators, it is difficult to run three-phase alternating current inverter generators in parallel as taught by the Reference 1.

An object of embodiments of this invention is therefore to overcome the foregoing problem by providing a parallel running control apparatus for inverter generators that can run a plurality of three-phase alternating current inverter generators in parallel.

In order to achieve the object, the embodiments provide in its first aspect a parallel running control apparatus for an inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, and a three-phase output terminal connected to terminal groups connected to the first, second and third inverters to output the converted alternating current as one of a U-phase, V-phase, and W-phase outputs and connected to a neutral terminal of the terminal groups, wherein the improvement comprises; the inverter generator A is adapted to run in parallel with at least one inverter generator B, which is configured to be same as the inverter generator A, to output a three-phase alternating current.

BRIEF DESCRIPTION OF DRAWINGS

The above and other objects and advantages will be more apparent from the following description and drawings in which:

FIG. 19 is a flowchart showing a preparation performed by a user and a corresponding operation of a parallel running control apparatus having an engine control section during a parallel running operation shown in FIG. 12 according to a third embodiment of the invention.

DESCRIPTION OF EMBODIMENTS

A parallel running control apparatus for inverter generators according to embodiments of the present invention will now be explained with reference to the attached drawings.

Figure 1:
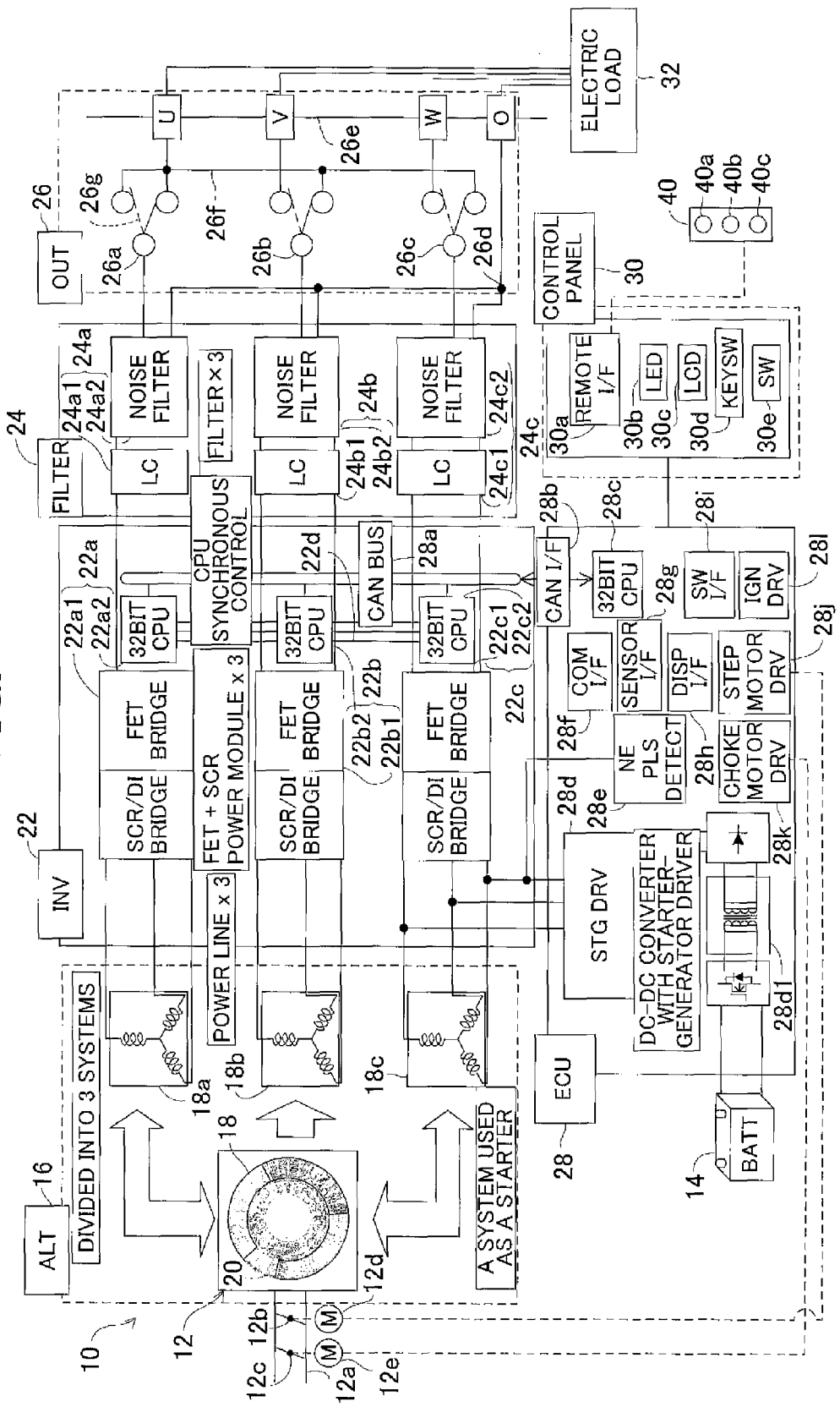
FIG. 1 is a block diagram showing a parallel running control apparatus for an inverter generator according to embodiments of the invention.

FIG. 1 is an overall block diagram showing a parallel running control apparatus for inverter generators according to a first embodiment of the invention.

In FIG. 1, symbol 10 designates an inverter generator. The generator 10 is equipped with an engine (internal combustion engine) 12 and has a rated output of about 5 kW (AC (alternating current) 100V, 50 A). The engine 12 is an air-cooled, spark-ignition gasoline engine.

A throttle valve 12b and choke valve 12c are installed in an air intake pipe 12a of the engine 12. The throttle valve 12b is connected to a throttle motor (composed of a stepper motor) 12d, and the choke valve 12c is connected to a choke motor (also composed of a stepper motor) 12e.

The engine 12 is equipped with a battery 14 whose rated output is about 12V. When power is supplied from the battery 14, the throttle motor 12d and choke motor 12e respectively drive the throttle valve 12b and choke valve 12c to open and close. The engine 12 has an alternator section (shown as "ALT") 16.

Figure 2:
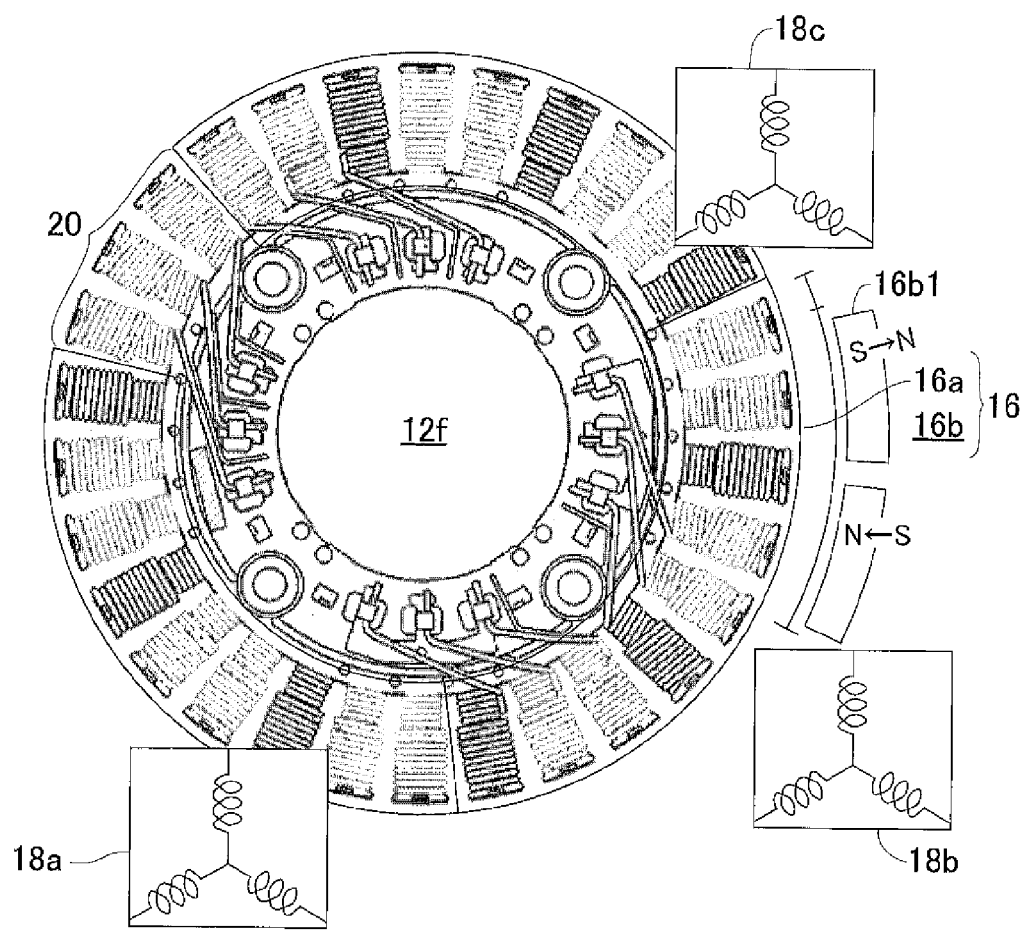
FIG. 2 is a plan view showing a crank case of an engine of the inverter generator shown in FIG. 1.

FIG. 2 is a plan view of a crank case 12f of the engine 12 shown in FIG. 1, where the alternator section 16 is provided.

As shown in FIG. 2, the alternator section 16 includes a stator 16a mounted on the crank case 12f of the engine 12, and a rotor 16b which is rotatably installed around the stator 16a and also functions as a flywheel of the engine 12.

The stator 16a comprises thirty teeth. Twenty-seven teeth of them are wound by three-phase output windings (main windings) 18 comprising of three sets of U, V and W-phase windings, and the other three teeth of them are also wound by one three-phase output winding (sub winding) 20 comprising one set of the U, V, and W-phase windings. The main windings 18 comprise windings 18a, 18b and 18c.

Multiple pairs of permanent magnet pieces 16b1 are embedded or attached inside the rotor 16b installed on the outer side of the stator 16a with radially oriented polarity reversed alternately to face the output windings 18, 20. In the alternator section 16, when the permanent magnet pieces 16b1 of the rotor 16b are rotated around the stator 16a, AC power of the U, V, and W-phase is outputted (generated) from the three-phase output windings 18 (more specifically, 18a, 18b, 18c) and the AC power of each phase is also outputted from the sub winding 20.

The explanation of FIG. 1 will be resumed. The generator 10 according to this embodiment has, in addition to the alternator section (ALT) 16 where the output windings 18 are wound, an inverter section (shown as "INV") 22, a filter section (shown as "FILTER") 24, an output section (shown as "OUT") 26, an engine control section (shown as "ECU") 28, and an engine control panel section (shown as "CONTROL PANEL") 30. The ECU (Electronic Control Unit) functions as an electronic control section and has a CPU as explained later.

As illustrated, the characteristic feature of the generator 10 according to this embodiment is that three sets (three) of single-phase inverter generators (inverters) are connected in parallel so that they can output a three-phase AC of a desired voltage in a desired phase or a single-phase AC of a desired voltage selectively and reliably.

Specifically, the generator 10 has three sets of windings 18 composed of first, second and third windings 18a, 18b, 18c, the inverter section 22 comprising three sets of the inverters composed of first, second and third inverters (inverter generators) 22a, 22b, 22c, the filter section 24 comprising three sets of filters composed of first, second and third filters 24a, 24b, 24c, the output section 26 comprising a three-phase output terminal 26e and a single-phase output terminal 26f, the engine control section 28 that controls an operation of the engine 12, and the control panel section 30.

The inverter section 22 and other sections are provided with, for example, semiconductor chips installed on a printed circuit board accommodated in a case located at an appropriate position of the engine 12. The control panel section 30 is also provided with semiconductor chips similarly installed at an appropriate position of the engine 12 and a panel connected thereto.

The output windings 18, the inverter section 22, the filter section 24 and the output section 26 (each comprising three sets labeled with letters a, b or c) are configured to be connected with the part of the same letter to each other correspondently.

The first, second and third inverters 22a, 22b, 22c constituting the inverter section 22 comprise single-phase two-wire inverters that have power modules 22a1, 22b1, 22c1 composed of FETs (Field Effect Transistors) and SCRs (thyristors) integrally connected thereto, 32-bit CPUs 22a2 (first controller), 22b2 (second controller), 22c2 (third controller), and interphase voltage/current sensors 22a3, 22b3, 22c3 for detecting voltage and current between phases of a power output. The CPUs 22a2, 22b2, 22c2 are connected via a communication path 22d with each other to be able to communicate therewith.

Figure 3:
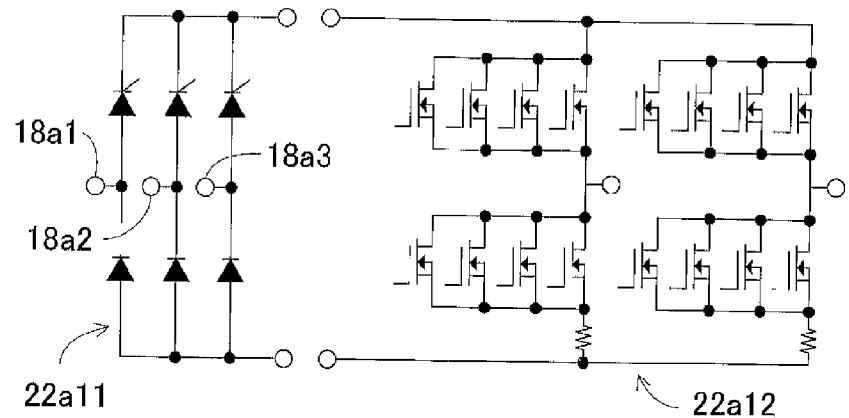
FIG. 3 is a circuit diagram showing a detailed configuration of an inverter section of the inverter generator shown in FIG. 1.

FIG. 3 is a circuit diagram showing a configuration of the inverter section 22 in detail. Although the following explanation will be made for the set a, the explanation can also be applied to the sets b and c, since their configurations are basically the same with each other.

As illustrated in FIG. 3, the power module 22a1 comprises a hybrid bridge circuit 22a11 in which three SCRs (Thyristors used as switching elements for direct current (DC) conversion) and three DIs (Diodes) are bridge-connected, and an H bridge circuit 22a12 in which four FETs are bridge-connected.

Three-phase AC power outputted (generated) from the U-phase winding 18a of the output windings 18 wound around the alternator section 16 is inputted to the first inverter 22a associated therewith and then inputted to a mid-point between the SCR and DI in the hybrid bridge circuit 22a11 of the power module 22a1.

A gate of the SCR in the hybrid bridge circuit 22a11 is connected to the battery 14 via a driver circuit (not shown). The CPU 22a2 controls current supply (ON; conducted) or termination of the current supply (OFF; not conducted) to the gate of the SCR from the battery 14 through the driver circuit.

Specifically, based on the output of the interphase voltage/current sensor 22a3, the CPU 22a2 turns ON (conducts) the gate of the SCR at a turn-on angle (angle of conduction) corresponding to a desired output voltage, such that the AC inputted to the power module 22a1 from the output winding 18a is converted into DC at the desired output voltage.

The DC outputted from the hybrid bridge circuit 22a11 is inputted to the FETs-H bridged circuit 22a12 where the FETs are connected to the battery 14. The CPU 22a2 controls current supply (ON; conducted) to the FETs or termination of current supply (OFF; not conducted), the inputted DC is inverted into AC in a desired frequency (e.g., a commercial frequency of 50 Hz or 60 Hz).

Figure 4:
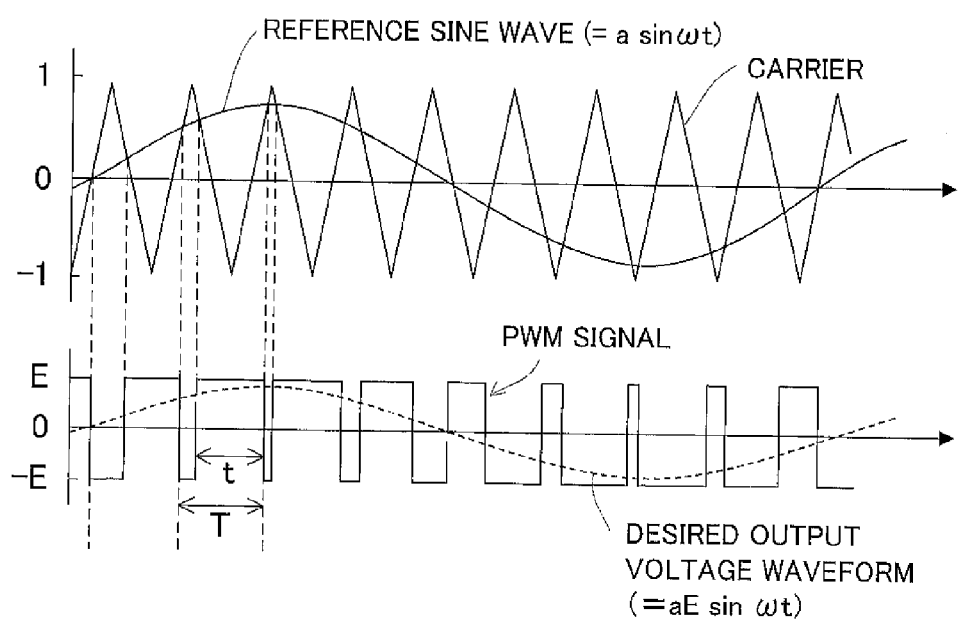
FIG. 4 is an explanatory view explaining an operation of the inverter section of the inverter generator shown in FIG. 1.

FIG. 4 is an explanatory view explaining an operation of the H bridge circuit 22a12.

As illustrated, the CPU 22a2 generates a reference sine wave (signal wave; shown by an upper solid-line wave) in a predetermined frequency (i.e., 50 Hz or 60 Hz commercial frequency) of the desired output voltage (in waveform), and compares the generated reference sine wave with a carrier (e.g., a 20 kHz carrier wave) using a comparator (not shown) so as to produce a PWM (Pulse Width Modulation) signal, and turns ON/OFF the FETs in the H bridge circuit 22a12 in accordance with the produced PWM signal.

The lower broken-line wave shown in the FIG. 4 indicates the desired output voltage (in waveform). It should be noted that the period T (step) of the PWM signal (PWM waveform) is actually much shorter than shown, but is enlarged in FIG. 4 for ease of understanding.

Again returning to the explanation of FIG. 1, the inverter section 22 is connected to the filter section 24.

The filter section 24 comprises LC filters (low pass filters) 24a1, 24b1, 24c1 that remove a higher harmonic wave and noise filters 24a2, 24b2, 24c2 that remove a noise. The AC output inverted in the inverter section 24 is inputted to the LC filters 24a1, 24b1, 24c1 and noise filters 24a2, 24b2, 24c2 to remove a higher harmonic wave and noise.

Figure 5:
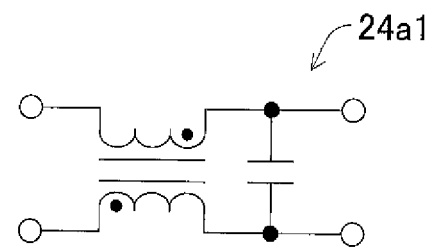
FIG. 5 is a circuit diagram showing a detailed configuration of a filter section of the inverter generator shown in FIG. 1.
Figure 6:
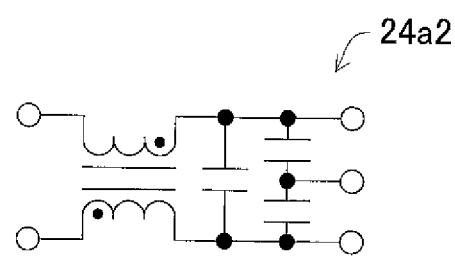
FIG. 6 is a circuit diagram similar to FIG. 5, but showing another detailed configuration of the filter section of the inverter generator shown in FIG. 1.

FIG. 5 shows a circuit configuration of the LC filter 24a1, and FIG. 6 shows a circuit configuration of the noise filter 24a2. Although not shown, circuit configurations of the LC filters 24b1, 24c1 and noise filters 24b2, 24c2 are the same.

In FIG. 1, the inverter section 22 is connected to the output section 26 via the filter section 24.

As shown in the figure, the output section 26 comprises a three-phase (four-wire) output terminal (output terminal) 26e and a single-phase (two-wire) output terminal 26f. The three-phase output terminal 26e is connected to terminal groups 26a, 26b, 26c which are connected to the first, second and third inverters 22a, 22b, 22c respectively and output one AC in a phase from among U, V, W-phases respectively, and is connected to a neutral terminal 26d of the terminal groups in series. The single-phase output terminal (output terminal) 26f is connected to the terminal groups in parallel and to the neutral terminal in series.

To be more specific, the three-phase (four-wire) output terminal 26e is respectively series-connected to a U-phase terminal 26a1 which is connected to the first inverter 22a and outputs a U-phase AC, to a V-phase terminal 26b1 which is connected to the second inverter 22b and outputs a V-phase AC, to a W-phase terminal 26c1 which is connected to the third inverter 22c and outputs a W-phase AC, and to the neutral O-phase terminal 26d which connects neutral points of the first, second and third inverters 22a, 22b, 22c.

Further, the output section 26 has the single-phase (two-wire) output terminal 26f which is parallel-connected to the U-phase terminal 26a1, to the V-phase terminal 26b1 and to the W-phase terminal 26c1, and is series-connected to the O-phase terminal 26d, and has a switching mechanism 26g that switches the three-phase output terminal 26e and the single-phase output terminal 26f.

The three-phase output terminal 26e and single-phase output terminal 26f are connected to an electric load 32 via a connector (not shown) and the like.

The engine control section 28 has a 32-bit CPU 28c and controls operation of the engine 12. The engine control section 28 is connected to the CPUs 22a2, 22b2, 22c2 (first, second and third controllers) of the inverters 22a, 22b, 22c via a CAN (Control Area Network) BUS 28a and a CAN I/F (Interface) 28b so that it can communicate with the CPUs 22a2, 22b2, 22c2. The output from the aforementioned output winding (sub winding) 20 is supplied to the CPU 22a2, 22b2, 22c2, 28c as their operating power.

The engine control section 28 has a starter-generator driver (STG DRV) 28d which operates the output winding 18c, in addition to the generator, as a starting device (starter) of the engine 12. Specifically, in this embodiment, one of the output windings 18a, 18b, 18c (e.g., output winding 18c) is configured to operate as an engine starter with the aid of the starter-generator driver 28d, in other words the alternator section 16 is configured to operate as a prime mover.

The starter-generator driver 28d comprises a DC-DC converter 28d1. As described later, the DC-DC converter 28d1 boosts the output (raises its voltage) of the battery 14 to about 200V and supplies the boosted battery output to the output winding 18c in response to a command from the CPU 28c so that the rotor 16b of the alternator section 16 is rotated relative to the stator 16a to start the engine 12.

The engine control section 28 further includes a TDC (Top Dead Center) circuit (not shown) to detect pulses outputted from a pulsar (not shown) made of a magnetic pickup installed at location close to the stator 16a or rotor 16b, and an engine speed detection circuit 28e that is connected to a U-phase terminal of the output winding 18c to detect an engine speed based on the output thereof.

The engine control section 28 further includes a communication (COM) I/F 28f, a sensor (SENSOR) I/F 28g, a display (DISP) I/F 28h, a switching (SW) I/F 28i, a drive circuit 28j that drives the throttle motor 12d, a drive circuit 28k that drives the choke motor 12e, and an ignition drive circuit 28l that drives an ignition device (not shown).

The aforementioned 32-bit CPU 28c determines an opening of the throttle valve 12b in such a manner that the engine speed converges at a desired engine speed calculated in accordance with required AC output to be supplied to the electric load 32, and supplies current (power) to the throttle motor 12d through the drive circuit 28j to control its operation.

The control panel section 30 has a remote (REMOTE) I/F 30a which is connected wirelessly (or in wired) to a remote control box 40 provided separately from the engine 12 and adapted to be carried by a user, an LED (Light Emitting Diode) 30b, an LCD (Liquid Crystal Display) 30c, a KEY switch (main switch) 30d which is adapted to be manipulated by the user and to send a command to operate (start) and stop the generator 10, and a three-phase/single-phase selector switch 30e which is adapted to send a command to switch the output from the generator 10 between the three-phase AC and single-phase AC.

The remote control box 40 (hereinafter called "remote controller") includes a start switch 40a, a stop switch 40b and a pilot lamp 40c. When the start switch 40a is turned ON by the user, the remote controller 40 sends a start signal to the engine control section 28 via the remote I/F 30a, while when the stop switch 40b is turned ON by the user, the remote controller terminates sending the start signal so that the engine control section 28 stops the engine 12. The start switch 40a and stop switch 40b correspond to a remote control switch (device operated by the user (user-operated device)) as described later.

The control panel section 30 and the engine control section 28 are connected wirelessly (or in wired) to communicate with each other. The outputs of the KEY switch 30d and selector switch 30e of the control panel section 30 are inputted to the engine control section 28 through the switching I/F 28i, and the engine control section 28 controls to flush the LED 30b and LCD 30c of the control panel section 30 through the display I/F 28h.

Figure 7:
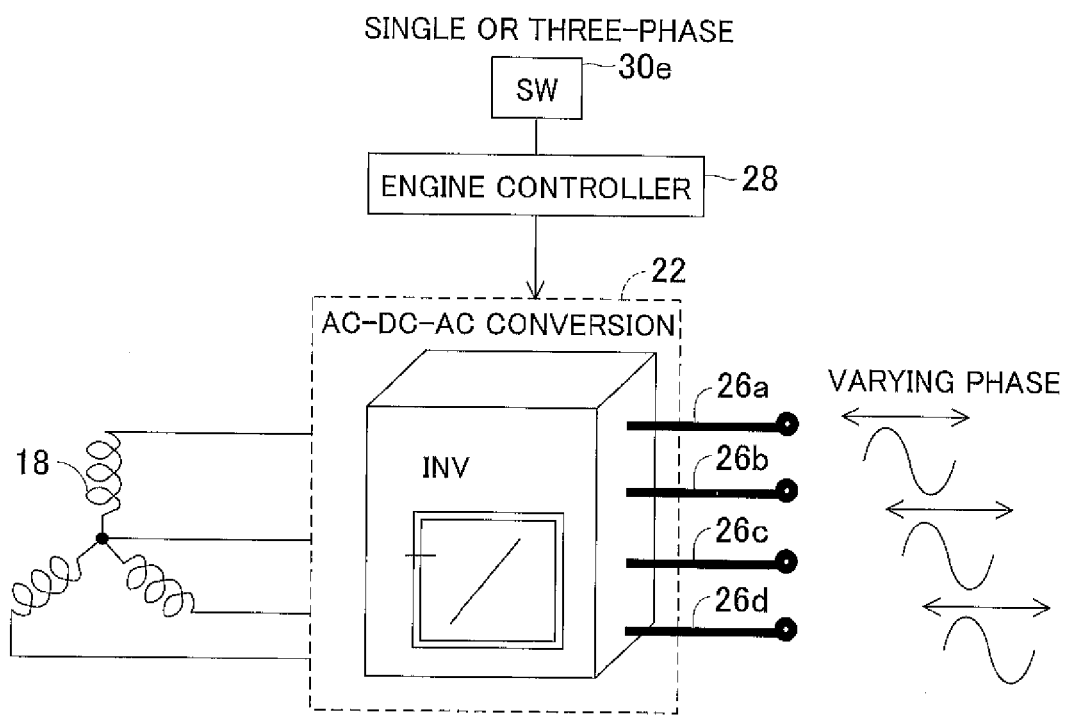
FIG. 7 is an explanatory view showing an operation of an engine control section of the inverter generator shown in FIG. 1.

FIG. 7 is an explanatory view showing an operation of the engine control section 28.

As described above, since the generator 10 of this embodiment is intended to selectively and reliably output the three-phase AC and single-phase AC at a desired voltage in a desired phase, the inverter section 22 is configured to have three sets of the single-phase inverters (first, second and third inverters) 22a, 22b, 22c, and the CPU 28c of the engine control section 28 is configured to operate the switching mechanism 26g of the output section 26 to switch the three-phase output terminal and the single-phase output terminal in response to the output of the selector switch 30e.

In the inverter section 22, one of the single-phase inverters 22a, 22b, 22c, e.g., the inverter 22a, is designated as a master inverter and the others as slave inverters. When the three-phase AC is to be outputted from the generator 10 along with the communication with the CPU 28c of the engine control section 28, as shown in FIG. 8, the CPUs 22a2, 22b2, 22c2 of the three sets of the single-phase inverters 22a, 22b, 22c control the operation of the inverter section 22, making the output phase from the U-phase output terminal 26a of the master inverter 22a as a reference, such that the output phases from the V-phase output terminal 26b and W-phase output terminal 26c of the slave inverters 22b, 22c are offset or delayed from that from the U-phase output terminal 26a by 120 degrees.

On the other hand, when the single-phase AC is outputted along with the communication with the CPU 28c, the CPUs 22a2, 22b2, 22c2 control the operation of the inverter section 22 to synchronize the outputs from the V-phase output terminal 26b and W-phase output terminal 26c of the slave inverters 22b, 22c in phase, making the output from the U-phase terminal 26a of the master inverter 22a as the reference, such that the single-phase AC is outputted from the single-phase output terminal 26f.

Figure 8:
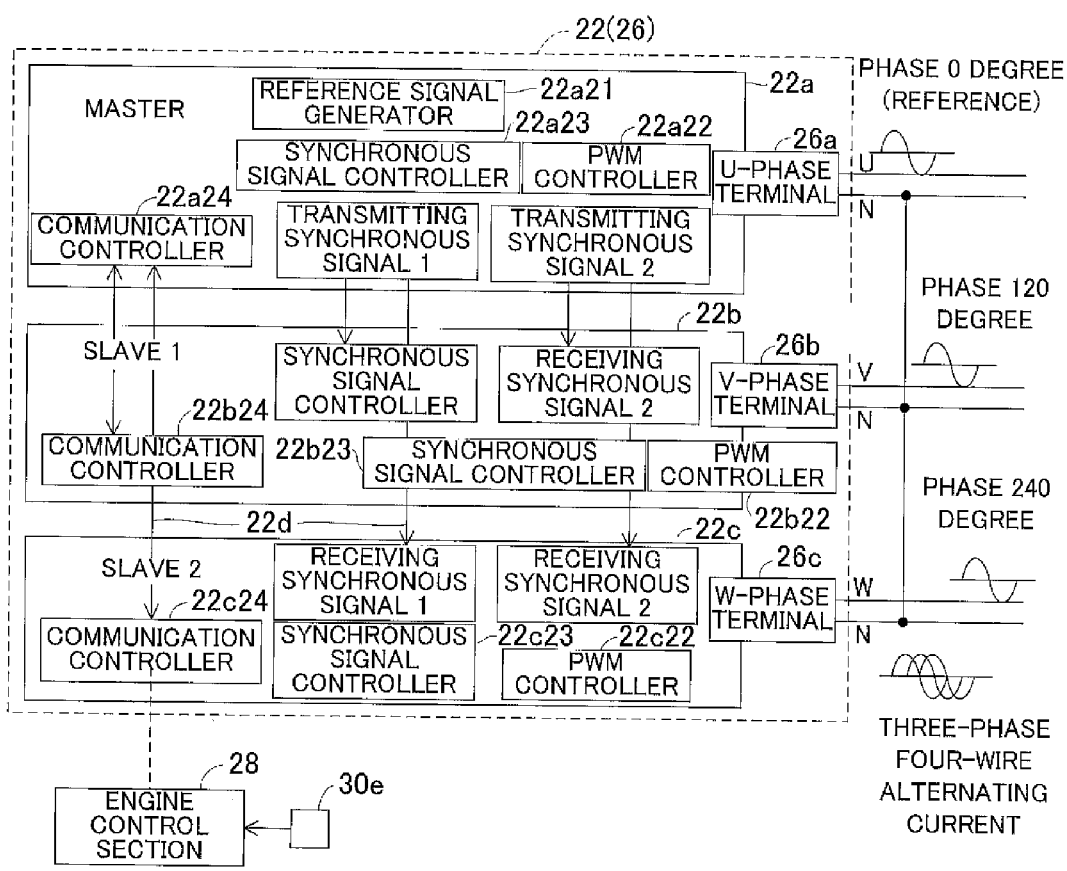
FIG. 8 is a block diagram specifically showing an operation of a controller of the inverter section of the inverter generator shown in FIG. 1.
Figure 9A:
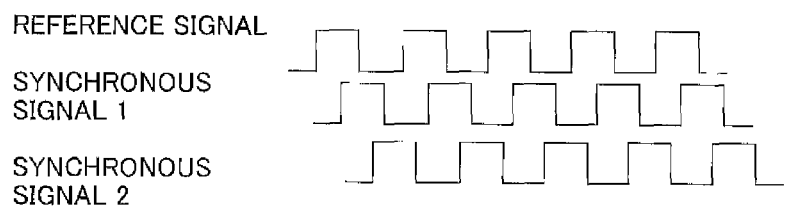
FIGS. 9A-9B are time charts explaining a reference signal and synchronous signals used in the configuration shown in FIG. 8.
Figure 9B:
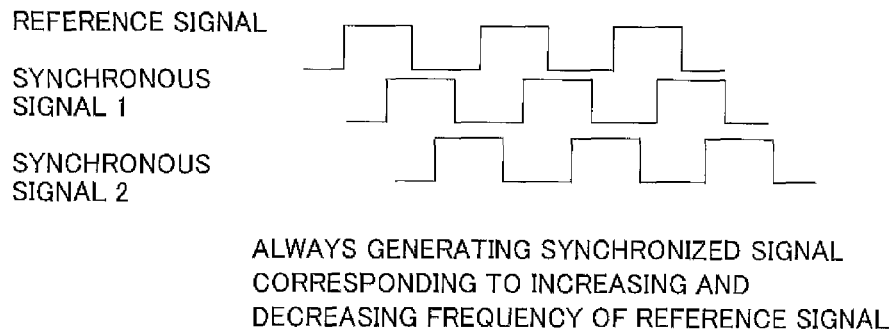

FIG. 8 is a block diagram showing an operation of the CPUs 22a2, 22b2, 22c2, specifically, an operation of an autonomous running control of the generator, and FIGS. 9A-9B are time charts explaining a reference signal and synchronous signals used in the operation of FIG. 8.

As illustrated, the CPU 22a2 of the first (master) inverter 22a has a reference signal generator 22a21 which generates the reference signal (shown in FIGS. 9A-9B) of the predetermined frequency, a PWM controller 22a22 which conducts a PWM control in response to the PWM signals described in FIG. 4, a synchronous signal controller 22a23 which generates synchronous signals 1, 2 (having a predetermined phase difference from the reference signal; shown in FIGS. 9A-9B) that are used to synchronize the output phases of the slave inverters 22b, 22c with the output phase of the master inverter 22a and transmits them to the CPU 22b2, 22c2, and a communication controller 22a24 which controls transmitting and receiving (communication of) the generated synchronous signals through the communication path 22d.

The second and third slave inverters 22b, 22c also have, except for the reference signal generator, PWM controllers 22b22, 22c22, synchronous signal controllers 22b23, 22c23 and communication controllers 22b24, 22c24 which are basically same as those of the master inverter 22a.

The CPU 22a2 of the first (master) inverter 22a, more specifically its synchronous signal controller 22a23 generates the synchronous signals 1, 2 offset by 120 degrees from the reference signal (in other words, the signals that have predetermined phase differences from the reference signal) and transmits them to the CPUs 22b2, 22c2, if the command to output (switch to) the three-phase AC is sent through the selector switch 30e. This will be same when the frequency of the reference signal is a predetermined frequency (FIG. 9A) or lower than the predetermined frequency (FIG. 9B).

Further, the CPU 22a2 of the first (master) inverter 22a communicates with the CPU 22b2, 22c2 and controls the operation of the inverter section 22 to synchronize the V-phase and W-phase outputs from the output terminals 26b, 26c with the output phase of the U-phase output terminal 26a, when the single-phase AC is to be outputted along with the communication with the CPU 28c, such that the single-phase AC is outputted from the single-phase output terminal 26f.

Specifically, the CPU 22a2 generates the reference signal of the predetermined frequency and the synchronous signals that have a predetermined phase difference (i.e., the same phase) from the reference signal, sends them to the CPUs 22b2, 22c2, and controls the operation of the inverter section 22 to synchronize the V-phase and W-phase outputs from the output terminals 26b, 26c with the output phase (reference) of the U-phase output terminal 26a, such that the single-phase AC is outputted from the single-phase output terminal 26f.

Figure 10:
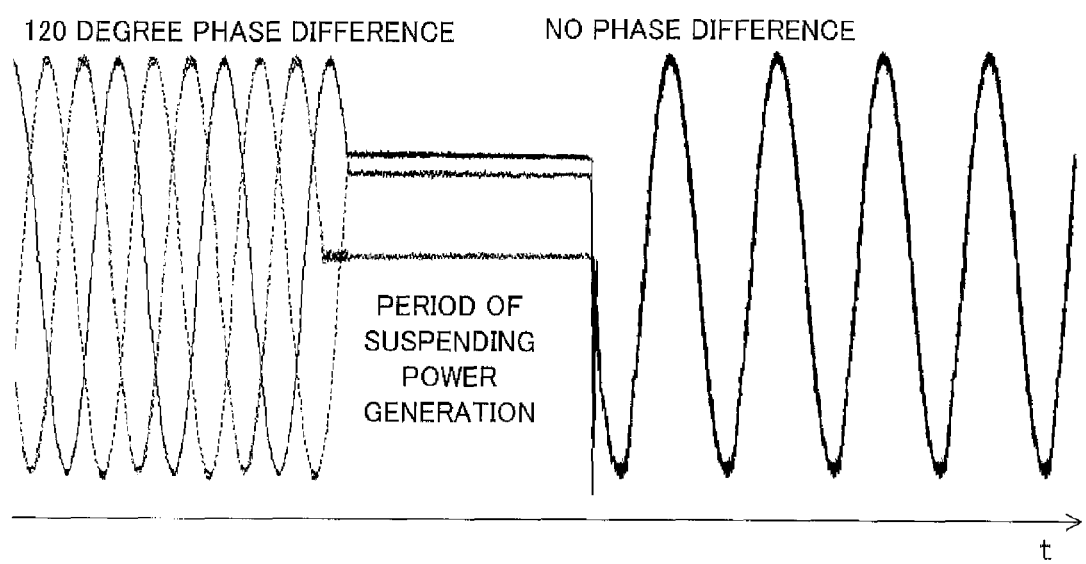
FIG. 10 is a time chart showing waveforms when an output is switched from a three-phase output to a single-phase output in response to the operation shown in FIG. 7 flowchart.
Figure 11:
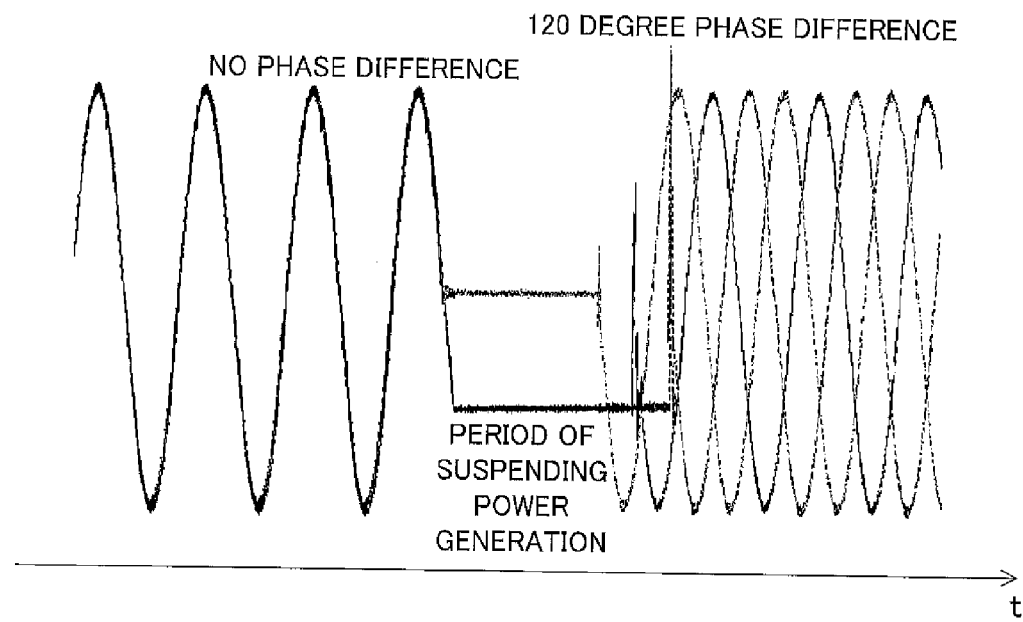
FIG. 11 is a time chart showing waveforms when an output is switched from a single-phase output to a three-phase output in response to the operation shown in FIG. 7 flowchart.

FIG. 10 is a time chart showing waveforms in a case where the output is switched from the three-phase output to the single-phase output, and FIG. 11 is a time chart showing waveforms in the opposite case. As shown, the three-phase output and single-phase output of the desired voltage are selectively outputted from the generator 10 in response to the manipulation of the selector switch 30e of the control panel section 30 by the user.

The characterized aspect of this embodiment of the invention is to provide a parallel running control apparatus for inverter generators that can run a plurality of the aforementioned inverter generators 10 in parallel, which will now be explained.

Figure 12:
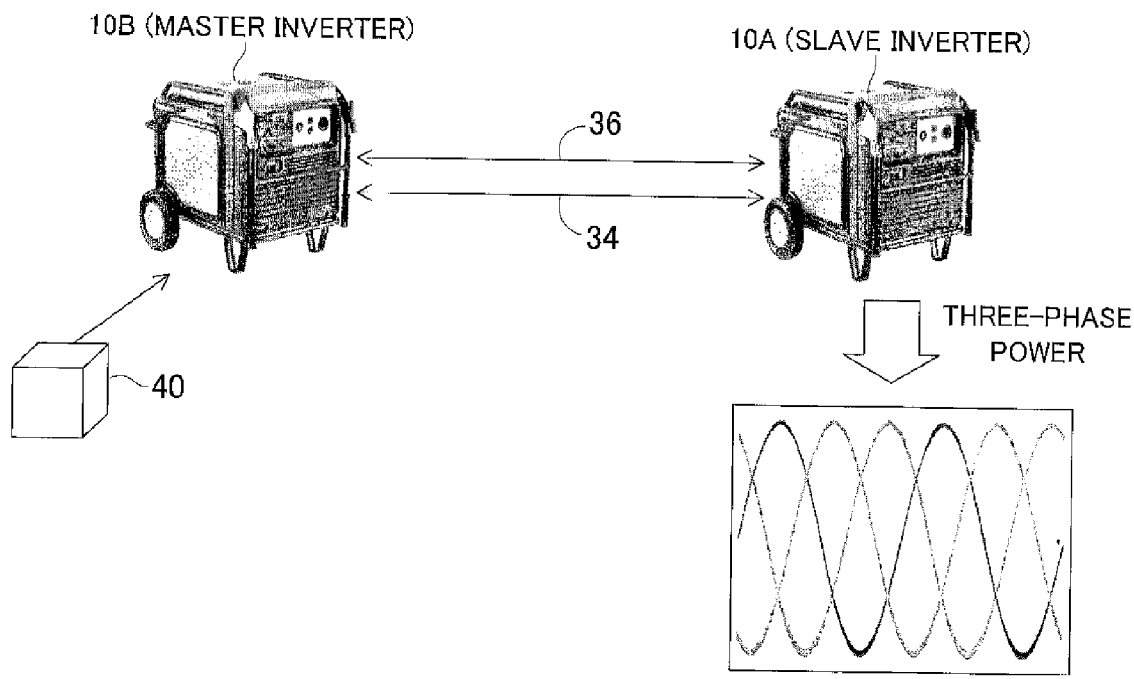
FIG. 12 is a perspective view of the inverter generators when running two inverter generators shown in FIG. 1 in parallel.
Figure 13:
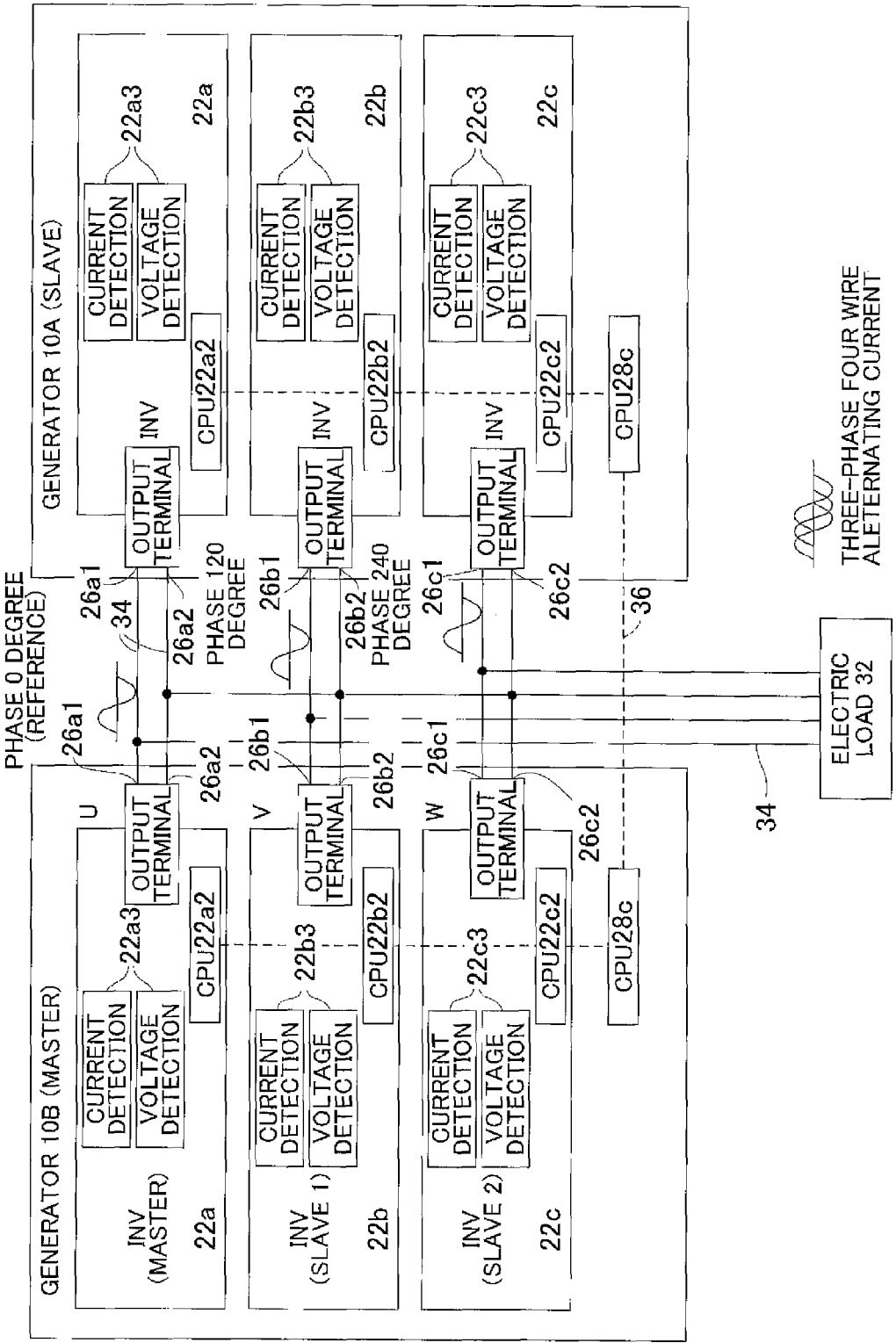
FIG. 13 a block diagram showing the operation of the controller of the inverter section during a parallel running operation of the two inverter generators shown in FIG. 12.

FIG. 12 is a perspective view of the inverter generators 10 (shown in FIG. 1), i.e., a plurality of, in specific, two inverter generators 10A, 10B to be run in parallel, and FIG. 13 is a block diagram showing an operation of the controllers of the inverter section 22 of the two generators 10A, 10B shown in FIG. 12. In this embodiment, the generator 10A is designated as a slave generator and the generator 10B as a master generator.

The generators 10A, 10B are connected to each other by a dedicated connection cable 34 and an external communication bus (CANBUS) 36. It is noted that the CPU 22a2 of the first inverter section 22 of the slave generator 10A functions as a parallel running control apparatus for the generators 10A, 10B in this embodiment.

As illustrated in FIG. 13, the U, V, W-phase terminals 26a1, 26b1, 26c1 and their neutral points 26a2, 26b2, 26c2 of the generator 10A are respectively connected to the corresponding U, V, W-phase terminals 26a1, 26b1, 26c1 and their neutral points 26a2, 26b2, 26c2 of the generator 10B via the connection cable 34. The output terminal (three-phase AC output terminal) 26e (shown in FIG. 1) comprises all the terminals of each of the generators 10A, 10B and is connected to the electric load 32 via the connection cable 34.

Specifically, in the generators 10A, 10B connected in parallel as illustrated, when the engine 12 of one of the generators, for instance, the slave generator 10A is started to generate power after the engine 12 of the master generator 10B is started to generate power, the U, V, W-phase AC each outputted from the inverters 22a, 22b, 22c of the generator 10B are detected by the corresponding interphase voltage/current sensors 22a3, 22b3, 22c3 of the generator 10A, and the CPUs 22a2, 22b2, 22c2 (first, second and third controllers) of the generator 10A separately control turning ON/OFF of the corresponding switching elements (SCRs in the hybrid bridge circuits 22a11, 22b11, 22c11 and FETs in the H bridge circuits 22a12, 22b12, 22c12) based on the detected voltage and current between phases so as to synchronize the each single-phase AC output from the corresponding inverters 22a, 22b, 22c of the generator 10A with the detected single-phase AC output from the corresponding inverters 22a, 22b, 22c of the generator 10B in terms of the voltage and phase, thereby running the generators 10A, 10B in parallel.

In other words, the CPUs 22a2, 22b2, 22c2 of the generator 10A detect zero-cross timings of the U, V, W-phase AC each outputted from the inverters 22a, 22b, 22c of the generator 10B based on the output of the interphase voltage/current sensors 22a3, 22b3, 22c3 of the generator 10A, and based on the detected zero-cross timings, separately control turning ON/OFF of the switching elements in the bridge circuits 22a12, 22b12, 22c12, etc., of the first, second and third inverters 22a, 22b, 22c, such that the U, V, W-phase AC each outputted from the corresponding first, second and third inverters 22a, 22b, 22c of own (the generator 10A) are synchronized with the outputs from the generator 10B.

Simultaneously, the master generator 10B operates the above-mentioned self-sustained running control. Since the three-phase AC output from the generator 10B is controlled by the CPU 22a2 (first controller) of the generator 10B, each of the first, second and third controllers 22a2, 22b2, 22c2 of the slave generator 10A only needs to control the output from own first, second and third inverters 22a, 22b, 22c to be synchronized with the outputs from the corresponding each inverter of the generator 10B in terms of the voltage and phase. With this, the generators 10A, 10B can run in parallel with three-phase AC outputs.

The single-phase AC outputs of U, V, W-phases synchronized for each of the corresponding inverters 22 of the generators 10A, 10B are supplied to the electric load 32 from the three-phase AC output terminal 26e through the connection cable 34.

As illustrated, since the neutral points 26a2, 26b2, 26c2 of the generator 10A and the corresponding neutral points 26a2, 26b2, 26c2 of the generator 10B are connected to the electric load 32 via the connection cable 34, the generators 10A, 10B run in parallel function as a three-phase four-wire inverter generator and supply the generated power to the electric load 32.

Further, as illustrated, the generators 10A, 10B, more specifically the CPUs 22a2, 22b2, 22c2 of the generators 10A, 10B are connected with the CANBUS 36 to send and receive data regarding the generated voltage, current, and the like between the master generator 10B and the slave generator 10A during the parallel running operation. With this, when the output from one of the master generator 10B and the slave generator 10A is lower than the output from the other, the CPUs of the generator with lower output control turning ON/OFF of the FETs in the H bridge circuits 22a12, 22b12, 22c12 or the like to correct magnitudes of amplitude and phase offsets of voltage to reduce an unbalanced current, a cross current and the like.

Figure 14:
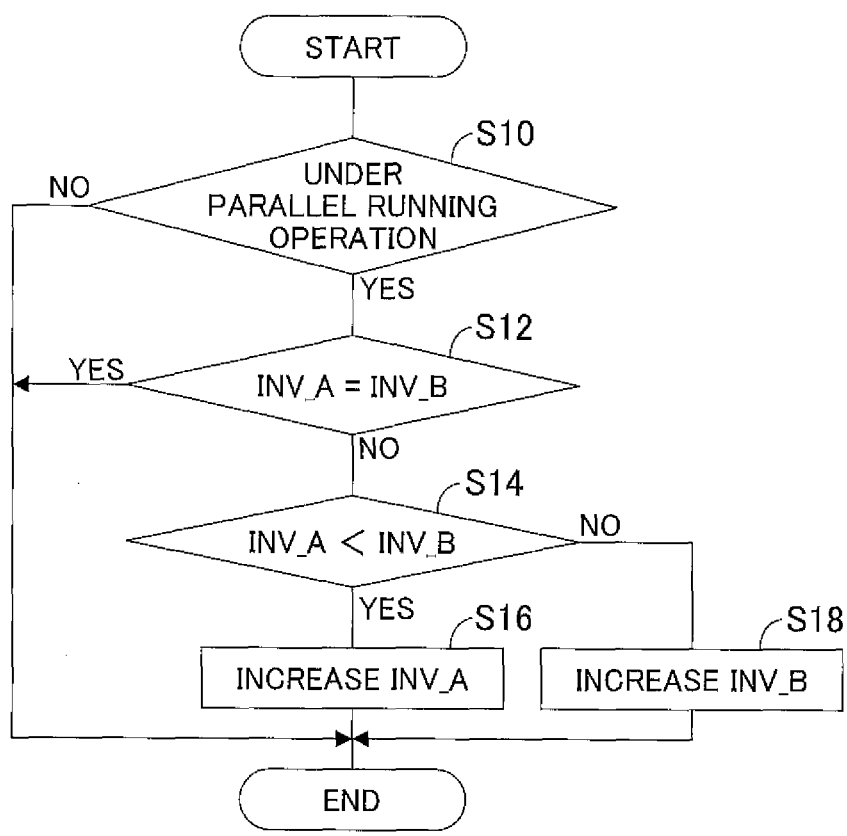
FIG. 14 is a flowchart similar to FIG. 13, but showing the operation of the controller of the inverter section during the parallel running operation of the two inverter generators shown in FIG. 12.

FIG. 14 is a flowchart for explaining the operation of the first, second and third controllers (CPUs 22a2, 22b2, 22c2) of the generator 10A. The illustrated program is executed in predetermined intervals when the engine 10 for the generator 10A to be run in parallel is started.

The following explanation will be made for the CPU 22a2 (first controller). However, since the configuration of each controller is basically the same, the explanation about the CPU 22a2 can be applied to both of the CPUs 22b2, 22c2 (second and third controllers).

As shown in FIG. 14, the program begins at S (step; processing step) 10, in which the CPU 22a2 of the generator 10A determines whether the generator 10A is under the parallel running operation with the generator 10B (i.e., the parallel running operation is in progress). Specifically, this is made by determining whether the interphase voltage/current sensor 22a3 can detect the output from the first inverter 22a of the generator 10B through the connection cable 34.

When the result in S10 is negative, the remaining steps are skipped, while when the result is affirmative, i.e., it is determined that the generator 10A is under the parallel running operation, the program proceeds to S12, in which it is determined whether its own (subject) output current value INV_A (of the first inverter 22a of the generator 10A) is equal to or substantially equal to an output current value INV_B of the generator 10B.

When the result in S12 is affirmative, the remaining steps are skipped, while when the result is negative, the program proceeds to S14, in which it is determined whether its own output current value INV_A is smaller than the output current value INV_B of the generator 10B.

When the result in S14 is affirmative, the program proceeds to S16, in which turning ON/OFF of the FETs in its own H bridge circuits 22a12, 22b12, 22c12 is controlled to increase its own output current value INV_A. While when the result in S14 is negative, the program proceeds to S18, in which the generator 10B is communicated to increase the output current value INV_B by executing the same control.

Figure 15:
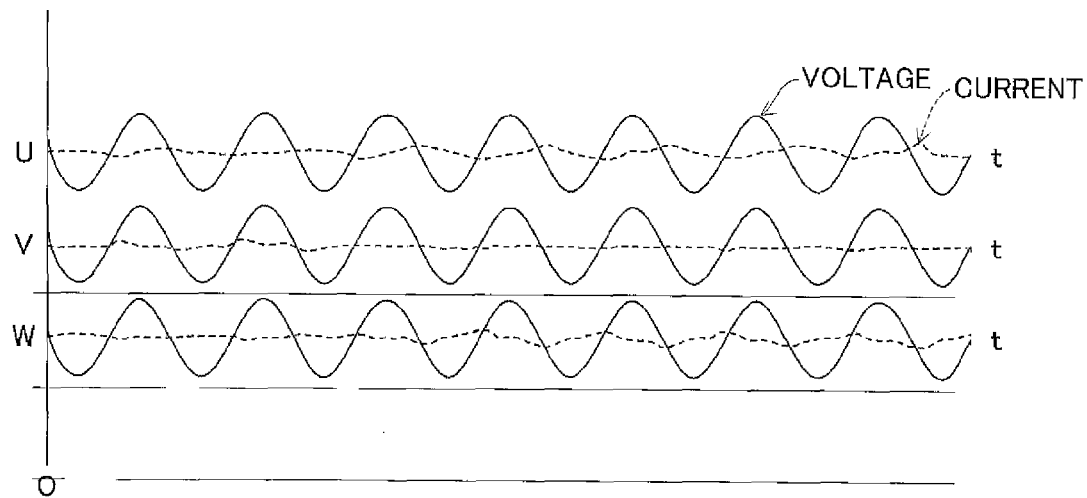
FIG. 15 is a time chart showing output waveforms during the parallel running operation under the processing of the FIG. 14 flowchart.
Figure 16:
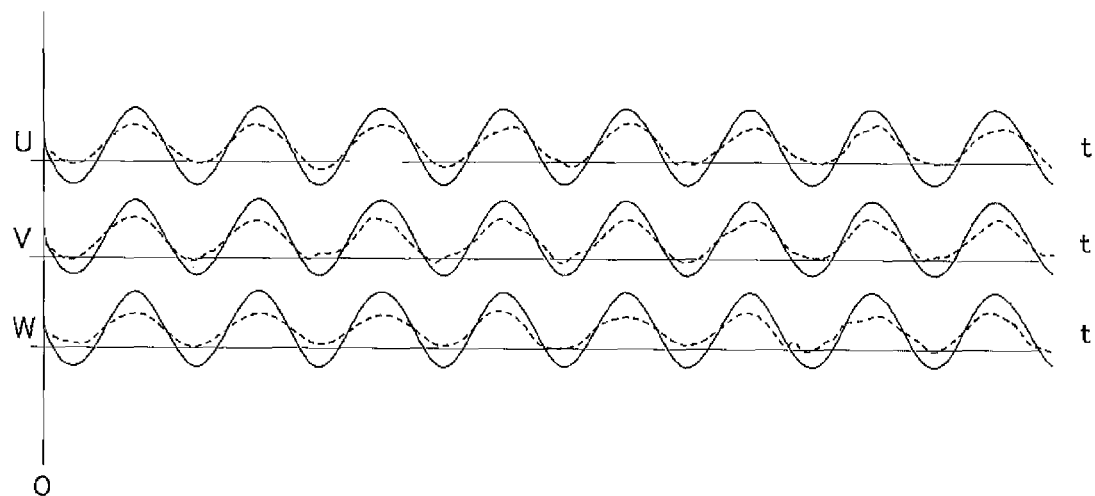
FIG. 16 is a time chart similar to FIG. 15, but showing the output waveforms during the parallel running operation under the processing of the FIG. 14 flowchart.

FIGS. 15, 16 are time charts for showing output waveforms during the parallel running operation of the two generators 10A, 10B according to this embodiment.

In this embodiment, the solid lines in FIGS. 15, 16 show voltage waveforms obtained by combining outputs from the generators 10A, 10B under the parallel running operation, and the dashed lines show current waveforms similarly obtained by combining the two outputs. FIG. 15 shows the waveforms in a case where the generators 10A, 10B are not connected to the electric load 32 (under a no-load operation), while FIG. 16 shows the waveforms in a case where the generators 10A, 10B are connected to the electric load 32 (under a load operation), specifically a 4 kW resistor in this example. It should be noted that although it might appear that a current is supplied to the load 32 even under the no-load operation shown in FIG. 15, the current drawn with the dashed line in FIG. 15 shows a cross current in between the generators 10A, 10B.

As illustrated in FIG. 16, when the generators 10A, 10B are connected to the load 32, the combined output current from the generators 10A, 10B is supplied to the load 32 and as illustrated, the output voltage in each phase is or substantially is equal to the others and the output current is equally distributed into each phase. In other words, each of the inverters 22a, 22b, 22c is controlled to share substantially the same load current.

As described above, the first embodiment is configured to have a parallel running control apparatus (10) for an inverter generator A (10A) having first, second and third windings (output windings 18a, 18b, 18c) wound around an alternator (16) driven by an engine (12), first, second and third inverters (22a, 22b, 22c) each connected to the first, second and third windings to convert alternating current outputted from the first, second and third windings into direct and alternating current through switching elements (SCRs in a hybrid bridge circuit 22a11 and an FET in an H bridge circuit 22a12) to output the converted alternating current, first, second and third controllers (CPUs 22a2, 22b2, 22c2) each adapted to control turning ON/OFF of the switching elements of the corresponding first, second and third inverters and connected to enable to be communicated with each other, and a three-phase output terminal (26e) connected to terminal groups (26d) connected to the first, second and third inverters to output the converted alternating current as one of a U-phase, V-phase, and W-phase outputs and connected to a neutral terminal (26d) of the terminal groups, wherein the improvement comprises; the inverter generator A is adapted to run in parallel with at least one inverter generator B (10B), which is configured to be same as the inverter generator A (10A), to output a three-phase alternating current.

With this, it becomes possible to run a plurality, e.g., two, of the three-phase AC output inverter generators 10 in parallel.

Further, the first embodiment is configured so that each of the first, second and third controllers (CPUs 22a, 22b, 22c)

has an interphase voltage/current detector ($22a3$, $22b3$, $22c3$) that detects voltage and current between phases inputted into the corresponding first, second and third inverters ($22a$, $22b$, $22c$) from the generator B ($10B$), and when U-phase, V-phase and W-phase terminals of the three-phase output terminal ($26e$) are connected to the corresponding U-phase, V-phase and W-phase terminals of the generator B via a connection cable ($34$), controls turning ON/OFF of the switching elements of the first, second and third inverters such that the outputs from the first, second and third inverters are synchronized with the detected voltage and current between phases. With this, each of the first, second and third inverters $22a$, $22b$, $22c$ can separately control the corresponding phase of the three-phase output respectively, such that the voltage and phase of the three-phase AC are synchronized surely. As a result, it becomes possible to run a plurality, e.g., two, of three-phase AC output inverter generators $10A$, $10B$ in parallel.

Specifically, the first embodiment is configured to detect the voltage and current between phases inputted into the first, second and third inverters $22a$, $22b$, $22c$ from the generator B ($10B$) and to control turning ON/OFF of the switching elements of the first, second and third inverters $22a$, $22b$, $22c$ to synchronize with the detected voltage and current between phases. In other words, the apparatus according to the first embodiment is configured so that each of the first, second and third inverters $22a$, $22b$, $22c$ separately controls the three-phase AC output. As a result, even when the generators are under an unbalanced load condition, e.g., when the generators supply power to a single-phase load where the output between phases is likely to lose a balance, it becomes possible to independently and separately execute the parallel running operation without affected by the outputs of other phases and to prevent the unbalanced current from increasing and/or the cross current between other generators from occurring during the parallel running operation.

Further, the first embodiment is configured so that the first, second and third controllers (CPUs $22a2$, $22b2$, $22c2$) of the generator B ($10B$) control the switching elements by making output from the first inverter as a reference such that the outputs from the first, second and third inverters become in a desired phase. With this, in addition to the above effects, it becomes possible to appropriately control the voltage and phase of the three-phase AC outputted from the first, second and third inverters $22a$, $22b$, $22c$ respectively.

Further, the first embodiment is configured so that the first controller (CPU $22a2$) of the generator B ($10B$) generates a reference signal and a synchronous signal having a predetermined phase difference from the reference signal and sends the synchronous signal to the second and third controllers (CPUs $22b2$, $22c2$), such that the first, second and third controllers control turning ON/OFF of the switching elements based on the reference signal and the synchronous signal in such a manner that the outputs from the first, second and third inverters become in the desired output phase. With this, in addition to the above effects, it becomes possible to more appropriately control the voltage and phase of the three-phase AC outputted from the first, second and third inverters $22a$, $22b$, $22c$ respectively.

Further, the first embodiment is configured so that the terminal groups ($26a$, $26b$, $26c$) of the first, second and third inverters ($22a$, $22b$, $22c$) are single-phase two-wire terminals each comprising one from among the U-phase, V-phase and W-phase terminals and the neutral terminal, and the three-phase output terminal ($26e$) comprises a three-phase four-wire terminal connected to the terminal groups and the neutral terminal. With this, in addition to the above effects, it becomes possible to run a plurality of three-phase AC output inverter generators $10$ in parallel with a simple structure.

Further, the first embodiment is configured so that the first, second and third controllers (CPUs $22a2$, $22b2$, $22c2$) control turning ON/OFF of the switching elements to correct at least one of a magnitude of amplitude and phase offset of voltage if the output from one of the first, second and third inverters ($22a$, $22b$, $22c$) is different from the corresponding output from the first, second and third inverters of the generator B ($10B$). With this, in addition to the above effects, it becomes possible to reliably run a plurality of three-phase four-wire AC inverter generators $10$ in parallel.

Next, a parallel running control apparatus for inverter generators according to a second embodiment of this invention will now be explained.

When connecting two inverter generators $10$ each outputting three-phase alternating current to run them in parallel, their three-phase output terminals $26e$ (more precisely, the terminal groups $26a$, $26b$, $26c$) of the generators have to be connected in accordance with phase relations correctly. Besides, if they are connected in error, it is unable to obtain a desired output from the generators.

An object of the second embodiment is therefore to overcome the above problem by providing a parallel running control apparatus for inverter generators which generate a desired three-phase AC output during the parallel running operation while allowing whose three-phase output terminals to be connected at random.

Figure 17:
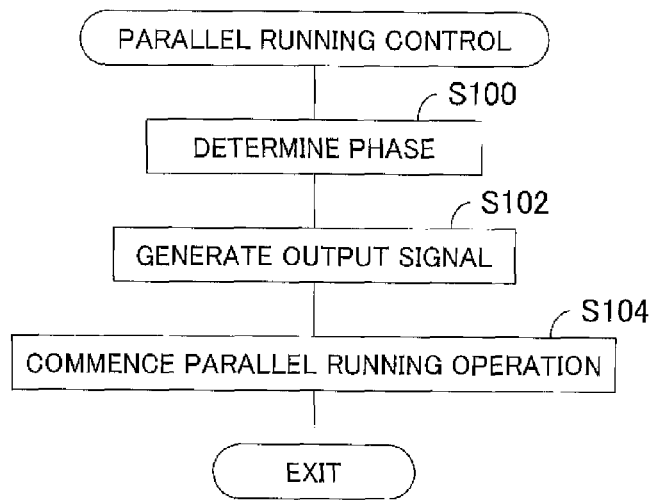
FIG. 17 is a flowchart showing an operation of a controller of an inverter section during a parallel running operation of two inverter generators shown in FIG. 12 according to a second embodiment of the invention.

FIG. 17 is a flowchart showing the operation of the CPUs $22a2$, $22b2$, $22c2$ (first, second and third controllers) of the inverter section $22$ of the subject generator $10A$ during a parallel running operation of the two generators $10A$, $10B$.

The illustrated program is executed when the parallel running control for the generators $10A$, $10B$ is commenced. The program begins at S100, in which each of the phase of single-phase AC output inputted to its own (subject) first, second and third inverters $22a$, $22b$, $22c$ from the first, second and third inverters $22a$, $22b$, $22c$ of the generator $10B$ through the connection cable $34$ is discriminated, and one from among own first, second and third inverters $22a$, $22b$, $22c$ to which the U-phase AC is inputted from the generator $10B$ is identified.

In other words, in the second embodiment, since their own terminal groups $26a$, $26b$, $26c$ of the three-phase output terminal $26e$ of the generator A are connected to the terminal groups $26a$, $26b$, $26c$ of the three-phase output terminal $26e$ of the generator $10B$ at random, the second embodiment is configured to have a phase discriminator that discriminates the phases of the single-phase AC outputs inputted to its own (subject) first, second and third inverters $22a$, $22b$, $22c$ from the first, second and third inverters $22a$, $22b$, $22c$ of the generator $10B$ through the connection cable $34$, and to specify the inverter to which the U-phase AC is inputted.

Specifically, in the second embodiment, based on the output of the interphase voltage/current sensor $22a3$, $22b3$, $22c3$, each of the CPUs $22a2$, $22b2$, $22c2$ of the generator $10A$ detects a zero-cross timing of the U-phase, V-phase and W-phase AC outputted from the inverters $22a$, $22b$, $22c$ of the generator $10B$ through the connection cable $34$. And based on the detected zero-cross timing, each of the CPUs $22a2$, $22b2$, $22c2$ discriminates the phases of the single-phase AC outputs inputted to its own (subject) first, second and third inverters $22a$, $22b$, $22c$ (of the generator $10A$) from the first, second and third inverters $22a$, $22b$, $22c$ of the generator $10B$, to identify the inverter to which the U-phase AC is inputted.

In the flowchart of FIG. 17, the program next proceeds to S102, in which based on the detected zero-cross timings and the discriminated phases, output synchronization signals to synchronize the outputs in terms of the phases and output order (the order of outputs), from its own first, second and third inverters 22a, 22b, 22c with the outputs inputted through the connection cable 34 from the first, second and third inverters 22a, 22b, 22c of the generator 10B is generated.

Specifically, one of the first, second and third inverters 22a, 22b, 22c of the generator 10A is selected as a reference inverter, to be more specific, the inverter connected to the inverter of the generator 10B outputting the U-phase AC is selected as the reference inverter, and the reference inverter is controlled to output the U-phase AC. The other inverters are controlled to generate the output synchronization signals, which include the phases of the remaining two inverters and the output order (operation order for the first, second and third inverters 22a, 22b, 22c), so that the outputs from its own first, second and third inverters 22a, 22b, 22c are synchronized with the single-phase AC outputs of the U-phase, V-phase and W-phase inputted from the generator 10B.

The program next proceeds to S104, in which based on the output synchronization signals generated in S102, a synchronous operation of the reference inverter selected to output the U-phase AC with the corresponding inverter of the generator 10B is commenced, and the inverters that output the V-phase or W-phase are controlled to turn ON/OFF the switching elements thereof in order to synchronize with the single-phase AC outputs from the corresponding inverters of the generator 10B by communicating with the other CPUs and execute the parallel running operation with the generator 10B.

Figure 18:
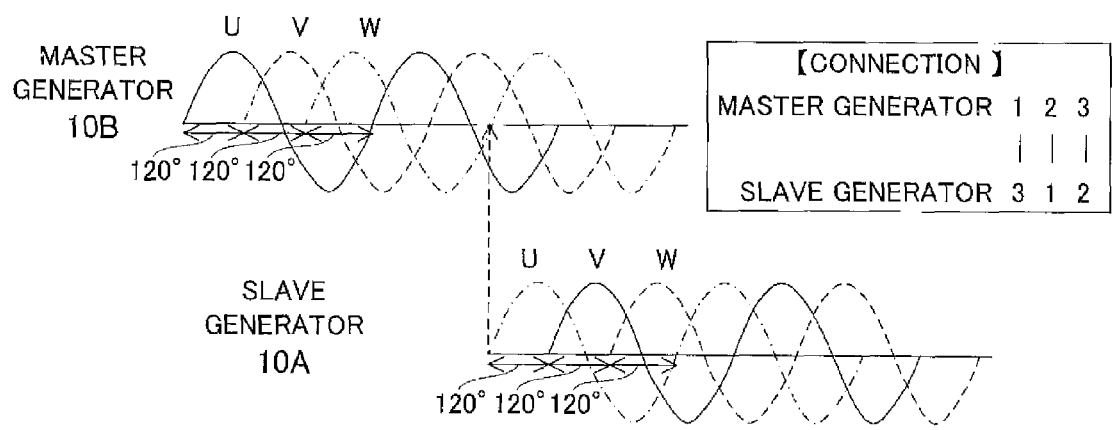
FIG. 18 is a time chart showing output waveforms during the parallel running operation of the two inverter generators shown in FIG. 12 according to the second embodiment of the invention.

FIG. 18 is a time chart for showing waveforms of the generators 10A, 10B according to the second embodiment of the invention. In the figure, the solid lines show the AC waveforms outputted from the first inverters 22a of the generators 10A, 10B, the dashed lines show the AC waveforms outputted from the second inverters 22b of the generators 10A, 10B, and the alternate long and short dashed lines show the AC waveforms outputted from the third inverters 22c of the generators 10A, 10b.

In the illustrated embodiment, the first inverter 22a of the generator 10B and the third inverter 22c of the generator 10A, the second inverter 22b of the generator 10B and the first inverter 22a of the generator 10A, and the third inverter 22c of the generator 10B and the second inverter 22b of the generator 10A are connected respectively.

As illustrated, in this embodiment, even if the three-phase output terminals 26e (more precisely, the terminal groups 26a, 26b, 26c) of the generators 10A, 10B are connected at random, each of the inverters 22a, 22b, 22c of the generator 10A can execute the synchronous control with the output from the connected first, second and third inverters 22a, 22b, 22c of the generator 10B in terms of the phase and output order (in the illustrated embodiment, the output order is 3, 1, 2). Consequently, it is possible to reliably run the generators 10A, 10B in parallel.

Further, in the second embodiment, since the master generator 10B executes the abovementioned self-sustained running control and therefore the three-phase AC output from the generator 10B is controlled by the first controller (CPU 22a2) of the generator 10B, each of the first, second and third controllers (CPUs 22a2, 22b2, 22c2) of the slave generator 10A only needs to control its own first, second and third inverters 22a, 22b, 22c to synchronize with the output from the corresponding inverter of the generator 10B in terms of the phase, etc. respectively in order to execute the parallel running operation for the generators 10A, 10B with the three-phase AC output.

As described above, the second embodiment of the invention is configured so that the first, second and third controllers (CPUs 22a2, 22b2, 22c2) discriminate a phase of a single-phase alternating current inputted into the corresponding first, second and third inverters (22a, 22b, 22c) from the generator B (10B) when the terminal groups (26a, 26b, 26c) of the three-phase output terminal (26e) are connected via a connection cable (34) to the terminal groups of the three-phase output terminal of the generator B (10B) at random, and control turning ON/OFF of the switching elements of the first, second and third inverters by making one of the discriminated outputs of the single-phase alternating currents as a reference such that the outputted single-phase alternating current becomes in a prescribed phase and in a predetermined output order.

With this, even when the terminal groups 26a, 26b, 26c of the three-phase output terminal 26e are connected to the terminal groups 26a, 26b, 26c of the three-phase output terminal 26e of the generator 10B at random, e.g., even when the U-phase terminal and V-phase terminal, the V-phase terminal and W-phase terminal, and the W-phase terminal and U-phase terminal are connected in error, each of the CPUs can discriminate the phase of the inputted single-phase AC, and by using one of the discriminated single phases, e.g., the single-phase AC inputted to the first inverter 22a, as a reference, it can control turning ON/OFF of the switching elements of the first, second and third inverters 22a, 22b, 22c, so that the single-phase outputs from the first, second and third inverters 22a, 22b, 22c are converged in the predetermined phases and output order. Thus, it becomes possible to run a plurality, e.g., two of the three-phase AC output inverter generators 10 in parallel even if the terminal groups 26a, 26b, 26c of the three-phase output terminal 26e are connected at random.

It should be noted that the other configuration and effects are the same as those of the apparatus according to the first embodiment so the explanation thereof will be omitted.

Next, a parallel running control apparatus for inverter generators according to a third embodiment of this invention will now be explained.

The inverter generator having an inverter that converts the AC output from windings wound around an alternator driven by an engine into direct and alternating current to generate AC power is usually configured such that the user manipulates a device such as a remote control switch (a switch on the remote controller 40) to start and stop. Hence, when the user is about to run a plurality, e.g., two of the generators in parallel, the user must manipulate the device repeatedly to start and stop the all of the generators.

An object of the third embodiment of the invention is therefore to overcome the above problem by providing a parallel running control apparatus for inverter generators that can allow the user to start and stop all of the generators by manipulating only one device for all of the generators.

FIG. 19 is a flowchart showing a preparation performed by the user and a corresponding operation of the parallel running control apparatus having an engine control section during a parallel running operation shown in FIG. 12 according to the third embodiment.

The program begins at S200, in which the processing is started when the user turns the KEY switch 30d of the (master) generator 10B to a remote position. The remote position is a position at which the generator 10B can be operated via the remote controller 40.

The program next proceeds to S202, in which when the user turns ON the start switch 40a of the remote controller 40, a command is sent to the engine control section 28 of the generator 10B through the remote I/F 30a, and to S204, in which the engine 12 is started by the CPU 28*c* of the engine control section 28. As a result, the generator 10B starts generating power in S206.

The program next proceeds to S208, in which the generator 10B generates a parallel running operation start signal and sends it to the generator 10A through the external communication bus 36.

On the other hand, in the (slave) generator 10A, the program begins at S300, in which the processing is started when the user turns the KEY switch 30*d* to the remote position.

In the generator 10A, the program next proceeds to S302, in which the generator 10A waits for receiving the parallel running operation start signal to be sent from the generator 10B and upon the receipt of the signal, the program proceeds to S304, in which the engine 12 of the generator 10A is started.

Next, the program proceeds to S306, in which the CPU 28*c* of the engine control section 28 of the generator 10A determines whether voltage at a parallel running output terminal of the connection cable 34 is within a predetermined range, in other words, it is determined whether the output voltage is within the range that makes the parallel running operation possible. When the result in S306 is negative, the program proceeds to S308, in which the engine 12 of the generator 10A is stopped.

While when the result in S306 is affirmative, the program proceeds to S310, in which it is determined whether frequency of the voltage at the parallel running output terminal of the connection cable 34 is within a prescribed range. To be more specific, as shown in FIG. 10 when the generators 10A, 10B are run for the three-phase output, it is determined whether each of the phases of the frequency of the output voltage is synchronized with the corresponding phase of the other generator.

When the result in S310 is negative, the program proceeds to S308, while when the result in S310 is affirmative, the program proceeds to S312, in which the CPU 28*c* of the control section 28 of the generator 10A starts generating power.

The program next proceeds to S314, in which the CPU 28*c* of the control section 28 of the generator 10A repeatedly determines whether the parallel running operation start signal is kept being received from the generator 10B. When the result is negative, the program proceeds to S308 to stop the engine 12 of the generator 10A.

As stated above, the third embodiment of the invention is configured so that the generator A (10A) further includes a parallel running operation start signal receiver (S302) adapted to receive a parallel running operation start signal sent from the generator B (10B) after the generator B starts the engine (12) to generate power in response to a start signal sent through a device (remote control switches (start switch 40*a*, stop switch 40*b*) of a remote controller 40) operated by a user, an engine starter (S304) adapted to start the engine of the generator A upon receiving the parallel running operation start signal from the generator B, a voltage determiner (S306) adapted to determine whether a voltage at a parallel running output terminal is within a predetermined range, and a generation starter (S312) adapted to start generating power from the generator A when the voltage at the parallel running output terminal is determined to be within the predetermined range.

With this, when the user starts the generator B (10B) by sending a start signal to the generator B (10B) via the user-operated device, e.g., the start switch 40*a* of the remote controller 40, the generator A (10A) can also be started through the generator B (10B). Accordingly, since the user can start and stop all of the generators 10A, 10B by manipulating only one device for all of the generators 10A, 10B, the operation becomes easy and the operability is improved considerably. Further, since the generator A (10A) can start generating power if the voltage at the parallel running output terminal is within the predetermined range, it becomes possible to prevent an erroneous operation from occurring and to reliably run the generators A (10A), B (10B) in parallel.

Further, since the third embodiment is configured so that the engine starter (S304) stops the engine (12) of the generator A (10A) to stop generating power when the parallel running operation start signal to be sent from the generator B (10B) is disconnected after the generation starter starts generating power from the generator A, in addition to the above effects, the user can stop the generators 10A, 10B by merely terminating sending the start signal to the generator 10B via the user-operated device, e.g., via the stop switch 40*b* on the remote controller 40. Therefore, it becomes possible to make the operation easier and the operability is more improved.

Further, the third embodiment is configured so that the generator A (10A) further includes a frequency determiner (S310) adapted to determine whether a frequency at the parallel running operation output terminal is within a prescribed range; wherein the generation starter (S312) starts generating power from the generator A when it is determined that the voltage at the parallel running output terminal is within the predetermined range and the frequency at the parallel running output terminal is within the prescribed range. With this, in addition to the above effects, it becomes possible to synchronize the three-phase outputs in terms of the voltage and phases, thereby preventing an erroneous operation from occurring and reliably running the generators 10A, 10B in parallel.

Further, the third embodiment is configured so that the generator A (10A) further includes a single-phase output terminal (26*f*) adapted to be connected to the terminal groups (26*a*, 26*b*, 26*c*) in parallel and to the neutral terminal (26*d*) in series, a switching mechanism (26*g*) adapted to switch the three-phase output terminal and the single-phase output terminal; a three-phase and single-phase selector (30*e*) switch adapted to be manipulated by the user, and an engine controller (28) adapted to control an operation of the engine (12) and to send an output of the selector switch to the first, second and third controllers (CPUs 22*a*2, 22*b*2, 22*c*2) to operate the switching mechanism in response to the output of the selector switch, wherein the first, second and third controllers control turning ON/OFF of the switching elements by making the output from the first inverter as a reference, such that the output from the first, second and third inverters becomes the three-phase alternating current or single-phase alternating current in response to the output of the selector switch sent through the engine controller.

With this, in addition to the above effects, in response to the output from the switch 30*e* manipulated by the user, it becomes possible to output the three-phase AC and single-phase AC of the desired voltage selectively and reliably. Further, since the terminal groups 26*a*, 26*b*, 26*c* of the three-phase output terminal 26*e* are connected to the single-phase output terminal 26*f* in parallel, it can sufficiently utilize the output from the generator 10A (or the generator 10B).

It should be noted that in other aspects, the configuration and effects are the same as those of the apparatus according to the foregoing embodiments so the explanation thereof will be omitted.

As stated above, the first, second and third embodiments of the invention are configured to have a parallel running control apparatus (10) for an inverter generator A (10A) having first, second and third windings (output windings 18*a*, 18*b*, 18*c*) wound around an alternator (16) driven by an engine (12), first, second and third inverters (22*a*, 22*b*, 22*c*) each connected to the first, second and third windings to convert alternating current outputted from the first, second and third windings into direct and alternating current through switching elements (SCRs in a hybrid bridge circuit 22*a*11 and an FET in an H bridge circuit 22*a*12) to output the converted alternating current, first, second and third controllers (CPUs 22*a*2, 22*b*2, 22*c*2) each adapted to control turning ON/OFF of the switching elements of the corresponding first, second and third inverters and connected to enable to be communicated with each other, and a three-phase output terminal (26*e*) connected to terminal groups (26*d*) connected to the first, second and third inverters to output the converted alternating current as one of a U-phase, V-phase, and W-phase outputs and connected to a neutral terminal (26*d*) of the terminal groups, wherein the improvement comprises; the inverter generator A is adapted to run in parallel with at least one inverter generator B (10B), which is configured to be a same as the inverter generator A (10A), to output a three-phase alternating current.

In the apparatus, each of the first, second and third controllers (CPUs 22*a*, 22*b*, 22*c*) has an interphase voltage/current detector (22*a*3, 22*b*3, 22*c*3) that detects voltage and current between phases inputted into the corresponding first, second and third inverters (22*a*, 22*b*, 22*c*) from the generator B (10B), and when U-phase, V-phase and W-phase terminals of the three-phase output terminal (26*e*) are connected to the corresponding U-phase, V-phase and W-phase terminals of the generator B via a connection cable (34), controls turning ON/OFF of the switching elements of the first, second and third inverters such that the outputs from the first, second and third inverters are synchronized with the detected voltage and current between phases.

In the second embodiment, the apparatus is configured so that the first, second and third controllers (CPUs 22*a*2, 22*b*2, 22*c*2) discriminate a phase of a single-phase alternating current inputted into the corresponding first, second and third inverters (22*a*, 22*b*, 22*c*) from the generator B (10B) when the terminal groups (26*a*, 26*b*, 26*c*) of the three-phase output terminal (26*e*) are connected via a connection cable (34) to the terminal groups of the three-phase output terminal of the generator B (10B) at random, and controls turning ON/OFF of the switching elements of the first, second and third inverters by making one of the discriminated outputs of the single-phase alternating currents as a reference such that the outputted single-phase alternating current becomes in a prescribed phase and in a predetermined output order.

Further, in the second embodiment, the first, second and third controllers (CPUs 22*a*2, 22*b*2, 22*c*2) have an interphase voltage/current detector (22*a*3, 22*b*3, 22*c*3) that detects voltage and current between phases inputted into the corresponding first, second and third inverters (22*a*, 22*b*, 22*c*) from the generator B (10B), and control turning ON/OFF of the switching elements such that the outputs from the first, second and third inverters are synchronized with the detected voltage and current between phases.

Further, the first and second embodiments are configured so that the first, second and third controllers (CPUs 22*a*2, 22*b*2, 22*c*2) of the generator B (10B) control the switching elements by making output from the first inverter as a reference such that the outputs from the first, second and third inverters become in a desired phase.

Further, the first and second embodiments are configured so that the first controller (CPU 22*a*2) of the generator B (10B) generates a reference signal and a synchronous signal having a predetermined phase difference from the reference signal and sends the synchronous signal to the second and third controllers (CPUs 22*b*2, 22*c*2), such that the first, second and third controllers control turning ON/OFF of the switching elements based on the reference signal and the synchronous signal in such a manner that the outputs from the first, second and third inverters become in the desired output phase.

Further, since the first and second embodiments are configured so that the terminal groups (26*a*, 26*b*, 26*c*) of the first, second and third inverters (22*a*, 22*b*, 22*c*) are single-phase two-wire terminals each comprising one from among the U-phase, V-phase and W-phase terminals and the neutral terminal, and the three-phase output terminal (26*e*) comprises a three-phase four-wire terminal connected to the terminal groups and the neutral terminal.

Further, the first and second embodiments are configured so that the first, second and third controllers (CPUs 22*a*2, 22*b*2, 22*c*2) control turning ON/OFF of the switching elements to correct at least one of a magnitude of amplitude and phase offset of voltage if the output from one of the first, second and third inverters (22*a*, 22*b*, 22*c*) is different from the corresponding output from the first, second and third inverters of the generator B (10B).

In the third embodiment, the apparatus is configured so that the generator A (10A) further includes a parallel running operation start signal receiver (S302) adapted to receive a parallel running operation start signal sent from the generator B (10B) after the generator B starts the engine (12) to generate power in response to a start signal sent through a device (remote control switches (start switch 40*a*, stop switch 40*b*) of a remote controller 40) operated by a user, an engine starter (S304) adapted to start the engine of the generator A upon receiving the parallel running operation start signal from the generator B, a voltage determiner (S306) adapted to determine whether a voltage at a parallel running output terminal is within a predetermined range; and a generation starter (S312) adapted to start generating power from the generator A when the voltage at the parallel running output terminal is determined to be within the predetermined range.

Further, the third embodiment is configured so that the engine starter (S304) stops the engine (12) of the generator A (10A) to stop generating power when the parallel running operation start signal to be sent from the generator B (10B) is disconnected after the generation starter starts generating power from the generator A.

The apparatus according to the third embodiment is further configured so that the generator A (10A) further includes a frequency determiner (S310) adapted to determine whether a frequency at the parallel running operation output terminal is within a prescribed range; wherein the generation starter (S312) starts generating power from the generator A when it is determined that the voltage at the parallel running output terminal is within the predetermined range and the frequency at the parallel running output terminal is within the prescribed range.

The apparatus according to the third embodiment is further configured so that the generator A (10A) further includes a single-phase output terminal (26*f*) adapted to be connected to the terminal groups (26*a*, 26*b*, 26*c*) in parallel and to the neutral terminal (26*d*) in series, a switching mechanism (26*g*) adapted to switch the three-phase output terminal and the single-phase output terminal; a three-phase and single-phase selector (30*e*) switch adapted to be manipulated by the user, and an engine controller (28) adapted to control an operation of the engine (12) and to send an output of the selector switch to the first, second and third controllers (CPUs 22*a*2, 22*b*2, 22c2) to operate the switching mechanism in response to the output of the selector switch; wherein the first, second and third controllers control turning ON/OFF of the switching elements by making the output from the first inverter as a reference, such that the output from the first, second and third inverters becomes the three-phase alternating current or single-phase alternating current in response to the output of the selector switch sent through the engine controller.

It should be noted that in the foregoing embodiments, although an inverter generators having three sets of inverters are explained as an example, the embodiments can be applied for any generators with an inverter which generates AC power from the output of a winding wound around an alternator driven by an engine.

It should also be noted that, although the FETs are used as the switching elements of the inverter section 22, any other switching elements such as IGBTs (Insulated Gate Bipolar Transistors), etc. can be used.

It should also be noted that although the above explanation is made with only focus on the generator 10A, since the other generator 10B run in parallel is configured to be the same, even if the generators 10A and 10B are swapped, it brings the same effects.

It should also be noted that in the foregoing embodiments, although a parallel running control apparatus for two generators 10A, 10B are explained, the embodiments can be applied for any number of generators.

Japanese Patent Application Nos. 2011-110568, 2011-110569 and 2011-110570, all filed on May 17, 2011, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A parallel running control apparatus for an inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, and a three-phase output terminal connected to terminal groups connected to the first, second and third inverters to output the converted alternating current as one of a U-phase, V-phase, and W-phase outputs and connected to a neutral terminal of the terminal groups, wherein the inverter generator A is adapted to run in parallel with at least one inverter generator B, which is configured to be same as the inverter generator A, to output a three-phase alternating current, and each of the first, second and third controllers has an interphase voltage/current detector that detects voltage and current between phases inputted into the corresponding first, second and third inverters from the inverter generator B, and when U-phase, V-phase and W-phase terminals of the three-phase output terminal are connected to the corresponding U-phase, V-phase and W-phase terminals of the inverter generator B via a connection cable, controls turning ON/OFF of the switching elements of the first, second and third inverters such that the outputs from the first, second and third inverters are synchronized with the detected voltage and current between phases.

2. A parallel running control apparatus for an inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, and a three-phase output terminal connected to terminal groups connected to the first, second and third inverters to output the converted alternating current as one of a U-phase, V-phase, and W-phase outputs and connected to a neutral terminal of the terminal groups, wherein the inverter generator A is adapted to run in parallel with at least one inverter generator B, which is configured to be same as the inverter generator A, to output a three-phase alternating current, and wherein the first, second and third controllers discriminate a phase of a single-phase alternating current inputted into the corresponding first, second and third inverters from the inverter generator B when the terminal groups of the three-phase output terminal are connected via a connection cable to the terminal groups of the three-phase output terminal of the inverter generator B at random, and control turning ON/OFF of the switching elements of the first, second and third inverters by making one of the discriminated outputs of the single-phase alternating currents as a reference such that the outputted single-phase alternating current becomes in a prescribed phase and in a predetermined output order.

3. The apparatus according to claim 2, wherein the first, second and third controllers have an interphase voltage and current detector that detects voltage and current between phases inputted into the corresponding first, second and third inverters from the inverter generator B, and control turning ON/OFF of the switching elements such that the outputs from the first, second and third inverters are synchronized with the detected voltage and current between phases.

4. The apparatus according to claim 1, wherein the first, second and third controllers of the inverter generator B control the switching elements by making output from the first inverter as a reference such that the outputs from the first, second and third inverters become in a desired phase.

5. The apparatus according to claim 2, wherein the first, second and third controllers of the inverter generator B control the switching elements by making output from the first inverter as the reference such that the outputs from the first, second and third inverters become in a desired phase.

6. The apparatus according to claim 4, wherein the first controller of the inverter generator B generates a reference signal and a synchronous signal having a predetermined phase difference from the reference signal and sends the synchronous signal to the second and third controllers, such that the first, second and third controllers control turning ON/OFF of the switching elements based on the reference signal and the synchronous signal in such a manner that the outputs from the first, second and third inverters become in the desired output phase.

7. The apparatus according to claim 5, wherein the first controller of the inverter generator B generates a reference signal and a synchronous signal having a predetermined phase difference from the reference signal and sends the synchronous signal to the second and third controllers, such that the first, second and third controllers control turning ON/OFF of the switching elements based on the reference signal and the synchronous signal in such a manner that the outputs from the first, second and third inverters become in the desired output phase.

8. The apparatus according to claim 1, wherein the terminal groups of the first, second and third inverters are single-phase two-wire terminals each comprising one from among the U-phase, V-phase and W-phase terminals and the neutral terminal, and the three-phase output terminal comprises a three-phase four-wire terminal connected to the terminal groups and the neutral terminal.

9. The apparatus according to claim 2, wherein the terminal groups of the first, second and third inverters are single-phase two-wire terminals each comprising one from among the U-phase, V-phase and W-phase terminals and the neutral terminal, and the three-phase output terminal comprises a three-phase four-wire terminal connected to the terminal groups and the neutral terminal.

10. The apparatus according to claim 1, wherein the first, second and third controllers control turning ON/OFF of the switching elements to correct at least one of a magnitude of amplitude and phase offset of voltage if the output from one of the first, second and third inverters is different from the corresponding output from the first, second and third inverters of the inverter generator B.

11. The apparatus according to claim 2, wherein the first, second and third controllers control turning ON/OFF of the switching elements to correct at least one of a magnitude of amplitude and phase offset of voltage if the output from one of the first, second and third inverters is different from the corresponding output from the first, second and third inverters of the inverter generator B.

12. The apparatus according to claim 1, the generator A further including:
a parallel running operation start signal receiver adapted to receive a parallel running operation start signal sent from the inverter generator B after the inverter generator B starts the engine to generate power in response to a start signal sent through a device operated by a user;
an engine starter adapted to start the engine of the generator A upon receiving the parallel running operation start signal from the inverter generator B;
a voltage determiner adapted to determine whether a voltage at a parallel running output terminal is within a predetermined range; and
a generation starter adapted to start generating power from the generator A when the voltage at the parallel running output terminal is determined to be within the predetermined range.

13. The apparatus according to claim 12, wherein the engine starter stops the engine of the generator A to stop generating power when the parallel running operation start signal to be sent from the inverter generator B is disconnected after the generation starter starts generating power from the generator A.

14. The apparatus according to claim 12, the generator A further including:
a frequency determiner adapted to determine whether a frequency at the parallel running operation output terminal is within a prescribed range,
wherein the generation starter starts generating power from the generator A when it is determined that the voltage at the parallel running output terminal is within the predetermined range and the frequency at the parallel running output terminal is within the prescribed range.

15. The apparatus according to claim 12, the generator A further including:
a single-phase output terminal adapted to be connected to the terminal groups in parallel and to the neutral terminal in series;
a switching mechanism adapted to switch the three-phase output terminal and the single-phase output terminal;
a three-phase and single-phase selector switch adapted to be manipulated by the user; and
an engine controller adapted to control an operation of the engine and to send an output of the selector switch to the first, second and third controllers to operate the switching mechanism in response to the output of the selector switch,
wherein the first, second and third controllers control turning ON/OFF of the switching elements by making the output from the first inverter as a reference, such that the output from the first, second and third inverters becomes the three-phase alternating current or single-phase alternating current in response to the output of the selector switch sent through the engine controller.

16. A parallel running control apparatus for an inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, and a three-phase output terminal connected to terminal groups connected to the first, second and third inverters to output the converted alternating current as one of a U-phase, V-phase, and W-phase outputs and connected to a neutral terminal of the terminal groups,
wherein the inverter generator A is adapted to run in parallel with at least one inverter generator B, which is configured to be same as the inverter generator A, to output a three-phase alternating current,
wherein one of the first, second and third inverters is designated as a master inverter and the others are designated as slave inverters, and
wherein the first, second and third controllers are connected to enable to be communicated with each other via a CANBUS.

* * * * *